(12) United States Patent
Honda et al.

(10) Patent No.: US 6,211,358 B1
(45) Date of Patent: Apr. 3, 2001

(54) METHOD FOR PREPARING SOLUTION OF CELLULOSE ACYLATE METHOD FOR PRODUCING CELLULOSE ACYLATE FILM AND CELLULOSE ACYLATE FILM

(75) Inventors: Makoto Honda; Takatoshi Yajima, both of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/298,744

(22) Filed: Apr. 23, 1999

(30) Foreign Application Priority Data

Apr. 28, 1998 (JP) .................................................. 10-118262

(51) Int. Cl.⁷ ........................................................ C08B 3/00
(52) U.S. Cl. ................. 536/64; 536/63; 536/69; 536/124
(58) Field of Search .................. 536/64, 65, 68, 536/69, 76, 78, 80, 124, 63

(56) References Cited

U.S. PATENT DOCUMENTS 5,663,310 * 9/1997 Shimoda et al. ........................ 536/69

FOREIGN PATENT DOCUMENTS

| | | |
|---|---|---|
| 0 723 986 | 7/1996 | (EP) . |
| 0 779 321 | 6/1997 | (EP) . |
| 10095861 * | 4/1998 | (JP) . |
| 10095862 * | 4/1998 | (JP) . |
| 11071464 * | 3/1999 | (JP) . |

OTHER PUBLICATIONS

Cowie, J.M.G. et al, "The Dissolution and Stability of Cellulose Triacetate in Acetone", Makromolekulare Chemie, Macromolecular Chemistry and Physics, vol. 143, No. 3516, Jan. 1, 1971 pp. 105–114, XP002003283.

Patent Abstracts of Japan, vol. 098, No. 006, Apr. 30, 1998 of JP 10 048779 A, Feb. 20, 1998.

* cited by examiner

Primary Examiner—Howard C. Lee
(74) Attorney, Agent, or Firm—Frishauf, Holtz, Goodman, Langer & Chick, P.C.

(57) ABSTRACT

A method for preparing a solution of cellulose acylate is disclosed. The method comprises comprising the steps of (1) chilling an organic solvent containing no chlorinated organic solvent at a temperature of from −100° C. to −10° C., (2) mixing cellulose acylate containing an alkali-earth metal compound in an amount of from 10 ppm to 100 ppm with said chilled organic solvent to form a mixture, (3) swelling the cellulose acylate in the mixture, and (4) dissolving the mixture containing the swollen cellulose acylate by heating.

20 Claims, 6 Drawing Sheets

NOTE : ⊗ VALVE (THIS APPLIES TO THE FOLLOWING DRAWINGS)

METHOD FOR PREPARING SOLUTION OF CELLULOSE ACYLATE METHOD FOR PRODUCING CELLULOSE ACYLATE FILM AND CELLULOSE ACYLATE FILM

FIELD OF THE INVENTION

This invention relates to a method for preparing a solution of cellulose acylate to be used for producing a cellulose acylate film suitable for silver halide photographic light-sensitive material and liquid crystal image display device. The invention also relates to a cellulose acylate film produced by such method. A chlorinated carbon hydride such as methylene chloride is usually used in a solution of cellulose triacetate for producing a cellulose triacetate film for silver halide photographic light-sensitive material or a liquid crystal image displaying device. Methylene chloride (boiling point: 41° C.) is usually used as a suitable solvent for cellulose triacetate, because it has a low boiling point and is easily dried in the casting and drying processes in the course of the film production. Recently, however, the use of chlorinated compounds has become regulated. Accordingly, a production method of cellulose triacetate film using no methylene chloride is required. Acetone (boiling point: 56° C.), methyl acetate (boiling point: 56.3° C.), tetrahydrofuran (boiling point: 65.4° C.), 1,3-dioxolan (boiling point: 75° C.), nitromethane (boiling point: 101° C.), 1,4-dioxane (boiling point: 101° C.), epichlorohydrin (boiling point: 116° C.), and N-methylpyrrolidone (boiling point: 202° C.) are other known solvents capable of dissolving cellulose triacetate. However, according to results of practical dissolving experiments, these organic solvents have various disadvantages including explosive fumes and high boiling point.

Among the above-mentioned, acetone, although having a low boiling point, cannot dissolve cellulose triacetate by ordinary methods even though it swells the cellulose triacetate. Recently, it has been attempted to dissolve cellulose triacetate in acetone for producing fiber or film.

C. M. G. Cowie et al. report in "Die Makromolekulare Chemie", 135, p.p. 105–114, 1971 that a dilute solution having a concentration of from 0.5 to 5% by weight can be obtained by chilling a mixture of cellulose triacetate (acetalized degree of 60.1 to 61.3%) and acetone at a temperature of from −80° to −70° C. and thereafter heating the mixture. Such method for dissolving at a low temperature is called a chilling dissolving method. Kamide Kenji et al. described a spinning technology using the chilling dissolving method in "Dry Spinning from an Acetone Solution of Cellulose Triacetate" Seni Kikai Gakkai Shi vol. 34. No. 7, p.p. 57–61, 1981.

In Japanese Patent Publication Open to Public Inspection, herein after referred to as JP O.P.I., Nos. 9-95544 and 9-95557, it is proposed, based on the above-mentioned technology, to dissolve cellulose triacetate by the chilling dissolving method using a solvent substantially composed of acetone or a mixture of acetone and another organic solvent and to use the resulting solution for producing a film.

JP O.P.I. No. 9-95538 describes a film produced by the use of a solution in which cellulose triacetate is dissolved by the chilling dissolving method in a solvent selected from ethers, ketones and esters other than acetone. Preferred solvents are 2-methoxyethyl acetate, cyclohexane, ethyl formate and methyl acetate.

In JP O.P.I. No. 10-45804, a mixed fatty acid ester of cellulose capable of being dissolved in a solvent such as acetone and methyl acetate is proposed, in which an acetyl group and an acyl group having 3 or more carbon atoms have a specific relation.

The cellulose triacetate film cast from the cellulose triacetate solution which is prepared by the chilling dissolving method has problems such as inferior flatness and high haze, both of which have large fluctuations.

Moreover, the viscosity of solution prepared by the chilling dissolving method cannot be controlled suitably, and the viscosity of the solution is too high to be transported through piping for the casting thereof. Accordingly film formation is difficult since high pressure is necessary to transport the solution.

Cellulose acylate having a high substitution degree of the acyl group other than the acetyl group is insufficient in the physical properties. Therefore, as a practical matter, cellulose acetate having a low substitution degree of acyl groups can only be used. When the substitution degree of the acyl group is high, a specific dissolving method such as the chilling dissolving method is not necessary. However, when the substitution degree of the acyl group is low, the chilling dissolving method is necessary to dissolve it, and the above-mentioned problems remain.

Generally, a cellulose triacetate film is produced by a method called a "solution casting method" in which a solution of cellulose triacetate is cast on a substrate endlessly run and peeled, and the solvent is evaporated from the formed web. When the viscosity of the solution to be cast is excessively high, leveling of the solution on the substrate is insufficient, and in an extreme case the surface of the film is rough. Thus a film inferior in flatness is formed. Usually, a cellulose acylate solution having a viscosity within the range of from 0.5 Pa-s (5 pois) to 50 Pa-s (500 pois) is preferable for obtaining a cellulose triacetate film having a good flatness. The viscosity of cellulose acylate solution can be lowered by decreasing the polymerization degree of cellulose acylate or lowering the concentration of the solution. However, such means is difficult to apply for practical use since the film produced by such method has less mechanical strength and requires a great deal of time and energy to evaporate the solvent. Japanese Patent No. 61-40095 describes that the film formation can be easily performed by reducing the content of alkali-earth metal such as calcium and magnesium to not more than 30 ppm of the cellulose acetate because the viscosity of the solution obtained by dissolving the cellulose acetate at ordinary pressure and temperature using methylene chloride as an organic solvent, is considerable lowered. Although there is no description regarding the haze in this publication, it has been found as a result of experiments by the inventor using a chilling dissolving method that a cellulose acylate solution containing alkali-earth metal in an amount more than a certain value tends to be easily made turbid and the film made from such solution has a high haze. To limit the use of the chlorinated solvent as low as possible, it is necessary to solve the problems that a dope prepared by the use of an organic solvent such as acetone tends to be turbid, the film formed from such dope has a high haze and the turbidity and the haze can vary. The resolution of such the problems is important if one is to utilize the chilling dissolving method.

The object of the invention is to provide a production method of a cellulose acylate solution low in turbidity, using a non-chlorinated solvent rather than chlorinated solvents such as methylene chloride, and to provide a cellulose acylate film having a considerably low haze and excellent in the transparency; and production method using the solution.

The inventors found according to their study on the preparation method in which cellulose acylate can be sufficiently dissolved in a non-chlorinated solvent and the solution using the solvent has hardly any haze, and their study on a cellulose acylate transparent film having a low haze and a producing method therefor, that the content of alkali-earth metal in cellulose acylate relates to the turbidity and the haze, and the instability the turbidity and the haze is dependent on the content.

SUMMARY OF THE INVENTION

The object of the invention can be attained by a method for preparing a solution of cellulose acylate comprising the steps of chilling a first organic solvent containing substantially no chlorinated organic solvent at a temperature of from −100° C. to −10° C., mixing cellulose acylate containing an alkali-earth metal compound in an amount of from 10 ppm to 100 ppm with said chilled first organic solvent to form a mixture, swelling the cellulose acylate in the mixture, and dissolving the mixture containing the swollen cellulose acylate.

DETAILED DESCRIPTION OF THE INVENTION

Figure 1:
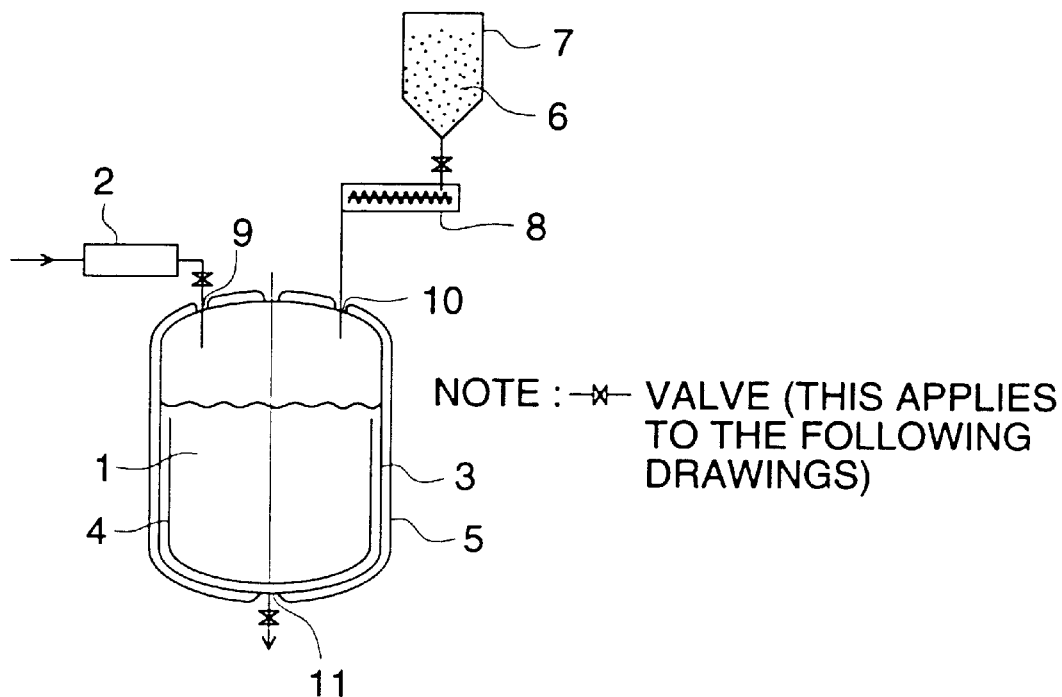
FIG. 1 is a schematic cross section of a mixing process.

In the cellulose acylate of the invention, the substitution degree of hydroxyl group by acyl group is fully satisfied the following equations I through IV.

$$2.6 \leq A+B \leq 3.0 \quad\quad\quad I$$

$$2.0 \leq A \leq 3.0 \quad\quad\quad II$$

$$0 \leq B \leq 0.8 \quad\quad\quad III$$

$$1.9 \leq A-B. \quad\quad\quad IV$$

In the equations, A and B are the substitution degree of acyl group substituting the hydroxyl group of cellulose, and A is the substitution degree of acetyl group and B is the substitution degree of acyl group having from 3 to 5-carbon atoms. In cellulose, three hydroxy groups per glucose unit and the foregoing value is the substitution degree with respect to 3.0 of the hydroxyl group. Accordingly the maximum value of the substitution degree is 3.0. Cellulose triacetate has usually a substitution degree of from 2.6, in such the case, there is 0.4 of unsubstituted hydroxyl group, to 3.0, and B is zero in cellulose triacetate. As the cellulose acylate of the invention, cellulose triacetate in which the acyl groups are all acetyl group, and one having a substitution degree of acetyl group is 2.0, that of acyl group having 3 to 5 carbon atoms of not more than 0.8 and an unsubstituted hydroxyl group of not more than 0.4, are preferable. One having a substitution degree of acyl group having 3 to 5 carbon atoms of not more than 0.3 is particularly preferable from the viewpoint of physical properties of the film thereof.

The substitution degree can be calculated from the measuring result of bonding degrees of acetic acid and a fatty acid having 3 to 5 carbon atoms substituting hydroxyl group. The measuring can be performed according to D-817-91 of ASTM.

The polymerization degree of cellulose acylate to be used in the invention is preferably from 200 to 700, more preferably 250 to 550. It has been generally known that a polymerization degree not less than 200 is necessary to give a high mechanical strength to a film, fiber and a molded matter of cellulose acylate or cellulose triacetate. This fact is described in "Cellulose Hand Book" edited by H. Sofue and N. Migita, Asakura Shobo, 1958, and "Course of Plastic raw materials 17" edited by H. Marusawa and K. Uda, Nikkankogyo Shinbun Sha. The polymerization degree of cellulose acylate film according to the invention is preferably from 250 to 350. The viscosity average polymerization degree can be measured by an Ostwald viscosity meter, and can be calculated from the intrinsic viscosity [η] of the cellulose acylate thus measured.

$$DP=[\eta]/Km$$

(In the equation, DP is the viscosity average polymerization degree and Km is a constant of $6 \times 10^{-4}$.)

Cellulose usable for the raw material of cellulose acylate includes cotton linter and wood pulp. Cellulose acylate made from any material can be used and the materials may be used in combination.

In the invention, a photographic grade cellulose triacetate is preferably used, the photographic grade cellulose triacetate is available on the market, which satisfies the quality such as the viscosity average polymerization degree and the oxidation degree. Makers of the photographic grade cellulose triacetate include Daiseru Kagaku Kogyo Co. Ltd., Courtaulds Co., Ltd., Hoechst Co., Ltd., and Eastman Kodak Co., Ltd., and the photographic grade cellulose triacetate produced by any of the above companies can be used.

Cellulose acylate having acetyl groups and acyl groups having 3 to 5 carbon atoms is called mixed fatty acid ester. The acyl groups other than the acetyl group having 3 to 5 carbon atoms are a propionyl group ($C_2H_5CO$—), an n- and i- butylyl group ($C_3H_7CO$—), n-, I-, s- and t-valeryl group ($C_4H_9CO$—). Among them, n- substituted one, particularly n- propionyl group, is preferable from the viewpoint of the ease of dissolving and mechanical strength after formation of film.

When the substitution degree of acetyl group is too low, the mechanical strength and the resistivity to moisture and heat of the film is lowered. When the substitution degree of the acyl group having 3 to 4 carbon atoms is too high, the mechanical strength is lowered even though the solubility in acetone and methyl acetate is raised. Suitable properties can be obtained when the substitution degree of each of the groups is within the above-mentioned range, respectively.

When an acid anhydride or an acid chloride is used as an acylating agent in the acylation of cellulose, an organic acid such as acetic acid and methylene chloride is used as the reaction solvent. A protonic catalyst such as sulfuric acid is preferably used as a catalyst when the acylating agent is the acid anhydride, and a basic compound is used when the acylating agent is the acid chloride (such as $CH_3CH_2COCl$). The most usual industrial synthesis method of mixed fatty acid ester of cellulose is a method in which cellulose is acylated by a mixed organic acid composition containing fatty acids each corresponding to acetyl group and another acyl group such as acetic acid, propionic acid, lactic acid and valeric acid, and their anhydrides. After the reaction, the sulfuric acid catalyst is neutralized by calcium acetate or magnesium acetate, and the cellulose acylate is precipitated in water and cut or powdered. The cut or powdered cellulose acylate is washed and dried. The cellulose acylate can be synthesized by a method described in JP O.P.I. No. 10-45804.

The alkali-earth metal contained in the cellulose acylate is an alkali-earth metal such as calcium acetate and magnesium acetate used for neutralizing after reaction the acid catalyst such as sulfuric acid which is used in the course of synthesizing the cellulose acylate. Reaction residues such as the catalyst and the neutralizing agent are removed from the synthesized cellulose ester by water treatment in the process for making in flake-form and the washing process, and the alkali-earth metals remain after such processes. Accordingly, it may be expected that the fluctuation of the turbidity and the haze is low if the condition for removing is constant and the remaining amount is constant. However, it is supposed that the remaining amount is not constantly held since the turbidity and the haze are actually fluctuated. However, the turbidity and the haze remain at a high level when the amount of alkali-earth is high even when the remaining amount is constant. In the invention, the object thereof is attained by the use of cellulose acylate in which the remaining amount is reduced and constantly maintained.

The alkali-earth metal contained in the cellulose acylate of the invention is from 10 to 100 ppm, preferably 10 to 50 ppm of the cellulose acylate. It is found that the turbidity and the haze are minimum within such range. Although the turbidity and the haze are low in the range of not more than 9 ppm, a long time and an excessively high cost are necessary for industrial production of cellulose acylate having such low content of alkali-earth metal. For example, the method for reducing the alkali-earth metal content described in Japanese Patent No. 61-40095 can be applied. In this publication, it is described that "10 g of cellulose triacetate is dissolved in 1000 g of glacial acetic acid, and 1000 g of water is added while stirring to precipitate the cellulose triacetate. The precipitated cellulose triacetate is taken out by filtration and dried for a day at 110° C.". This method is useful for preparing a sample even though it is not suitable for practical use. Other than the above-mentioned, cellulose acylate according to the invention can be obtained by a method in which the cellulose ester is swelled or dissolved in a water-soluble organic solvent such as methyl acetate, acetone and 1,3-dioxolan and poured into water being vigorously stirred, or a method in which a cellulose ester solution is vigorously poured in water to solidify the cellulose ester so as to make fine particles, after acylating the reaction process and the neutralization process. In the case of neutralization by magnesium acetate, excessive magnesium acetate is usually used with respect to the sulfuric acid catalyst. If the magnesium completely remains, the content of the remaining magnesium becomes several thousands ppm with respect to the cellulose ester. Therefore, sufficient treatment is necessary.

The chilling dissolving method and the high pressure dissolving method of the invention are described below.

Esters such as ethyl formate, propyl formate, methyl acetate, ethyl acetate and 2-methoxyethyl acetate, ketones such as acetone, methyl ethyl ketone, diethyl ketone, di-isobutyl ketone, cyclohexanone and methylcyclohexanone, ethers such as di-iso-propyl ether, dimethoxy ethane, 1,4-dioxane, 1,3-dioxolan, tetrahydrofuran, anisol, 2-ethoxyethyl acetate and 2-methoxy ethanol, and alcohols such as methanol, ethanol, iso-propyl alcohol and fluoroalcohol are preferably used as the non-chlorinated organic solvent to be used for preparing a cellulose acylate solution, hereinafter referred to as dope, according to the dissolving method of the invention. These non-chlorinated organic solvents may be used in combination of two or more kinds thereof. In the invention, a combination of methyl acetate and another non-chlorinated organic solvent is preferably used. As the non-chlorinated organic solvent other than methyl acetate to be combined with methyl acetate, acetone, ethyl formate and cyclohexanone are preferred, and acetone is most preferable since it has a high dissolving ability and a high dissolving speed. The amount of the non-chlorinated organic solvent is preferably not less than 60% by weight of methyl acetate and not more than 40% by weight of the other non-chlorinated solvent with respect to the whole amount of the organic solvent. It is more preferable that the former is from 65 to 85% by weight and the later is from 15 to 35% by weight. Another non-chlorinated solvent may be contained in an amount of not more than 20% by weight. Hereinafter, the non-chlorinated solvent is referred to as organic solvent.

Fluoroalcohol is preferably used in the dope of the invention as a non-chlorinated organic solvent other than methyl acetate, acetone and cyclohexanone. Cellulose acylate is rapidly swelled and a cellulose acylate solution having a high transparency can be obtained when fluoroalcohol is contained in an amount of not more than 10% by weight relating the whole amount of the solvents. Fluoroalcohol having a boiling point of not more than 165° C. is useful and one having a boiling point of not more than 110° C., particularly not more than 80° C., is preferable. A fluoroalcohol having from 2 to about 8 is preferably usable. The fluoroalcohol is an aliphatic alcohol having a fluorine atom in the molecule thereof which may have a substituent. The substituent can be an aliphatic or aromatic group having a fluorine atom or no fluorine atom. Examples of such fluoroalcohol include the following in which the boiling point is shown in parenthesis.

2-fluoroethanol (103° C.)
2,2,2-trifluoroethanol (80° C.)
2,2,3,3-tetrafluoro-1-propanol (109° C.)
1,3-difluoro-2-propanol (55° C.)
1,1,1,3,3,3-hexafluoro-2-methyl-2-propanol (62° C.)
1,1,1,3,3,3-hexafluoro-2-propanol (59° C.)
2,2,3,3,3-pentafluoro-1-propanol (80° C.)
2,2,3,4,4,4-hexafluoro-1-butanol (114° C.)
2,2,3,3,4,4,4-heptafluoro-1-butanol (97° C.)
Perfluoro-tert-butanol (45° C.)
2,2,3,3,4,4,5,5-octafluoro-1-pentanol (142° C.)
2,2,3,3,4,4-hexafluoro-1,5-pentanediol (111.5° C.)
3,3,4,4,5,5,6,6,7,7,8,8-tridecafluoro-1-octanol (95° C.)
2,2,3,3,4,4,5,5,6,6,7,7,8,8-pentadecafluor-1-octanol (165° C.)
1-(pentafluorophenyl)ethanol (82° C.)
2,3,4,5,6-pentafluorobenzyl alcohol (115° C.)

These fluoroalcohols may be used singly or in combination.

A lower alcohol having from 1 to 6 carbon atoms may be contained in the dope of the invention. The examples of the lower alcohol include methanol, ethanol, propanol, i-propanol, n-butanol, s-butanol and cyclohexanol. Among them, methanol, thanol and n-butanol are preferable. The content of the lower alcohol is preferably not more than 20% by weight of the whole amount of the solvents. The cellulose acylate solution containing the lower alcohol having from 1 to 6 carbon atoms has a high layer strength even when the layer contains abundant remaining solvent at the time of casting and the layer can be easily peeled from the belt or drum substrate.

The preparation method of the dope of the invention is described below.

The chilling dissolving method of the invention is a method in which cellulose acylate of the invention is mixed with a chilled mixed solvent of methyl acetate and another non-chlorinated organic solvent while stirring to swell the cellulose acylate in the solvent. As the solvent, a mixture of methyl acetate and acetone is particularly preferable. Thereafter the mixture is heated to dissolve the cellulose acylate. The chilling temperature may be a temperature higher than the solidification point, and a temperature of from –100° C. to –10° C. is preferable from the viewpoint of the dissolving ability and easy handling. The cellulose acylate is dissolved by heating the chilled mixture at a temperature of from 0 to 120° C. and a uniform solution can be obtained. The operations of chilling and heating may be repeated for accelerating the dissolution. Satisfactory dissolution can be judged by visual observation on the appearance of the solution. It is preferable in the chilling dissolving method to use a sealed vessel to prevent water formed by condensation from the air, from mixing into the solution. The time necessary for dissolving can further be shortened in the chilling dissolving method by applying a high pressure during the chilling step and by reducing the pressure during the heating step. A pressure vessel is preferably used for applying the high pressure and the reduced pressure.

A rapid dissolving method is preferably used as a method for easily attaining the object of the invention, in which the dissolving time of the chilling dissolving method is made more efficient.

The first example of rapid dissolving method is described according to FIG. 1. An organic solvent 1 according to the invention is previously chilled to a temperature of from –100° C. to –10° C. in a chilling vessel 2 and put into a mixing vessel 3 having a heat-retaining jacket 5 through an organic solvent inlet 9. Cellulose acylate 6 stored in a silo 7 is transported by a screw-type feeder 8 and poured into the mixing vessel 3 through a cellulose acylate inlet 10 while vigorously stirring the solvent by a stirrer 4. The cellulose acylate is immediately swollen. The time for swelling cellulose acylate can be considerably shortened by the method of the invention in which the cellulose acylate is put into the chilled organic solvent compared to the method of chilling the cellulose acylate and the organic solvent after mixing thereof. The swollen mixture is sent to the next dissolving process through a mixture outlet 11. In the dissolving process, the swollen mixture is heated and dissolved. A usual swollen mixture may be heated in this process. A chilled organic solvent may be added to the cellulose acetate other than the example of the method in which the cellulose acylate is added to the chilled organic solvent.

Figure 2:
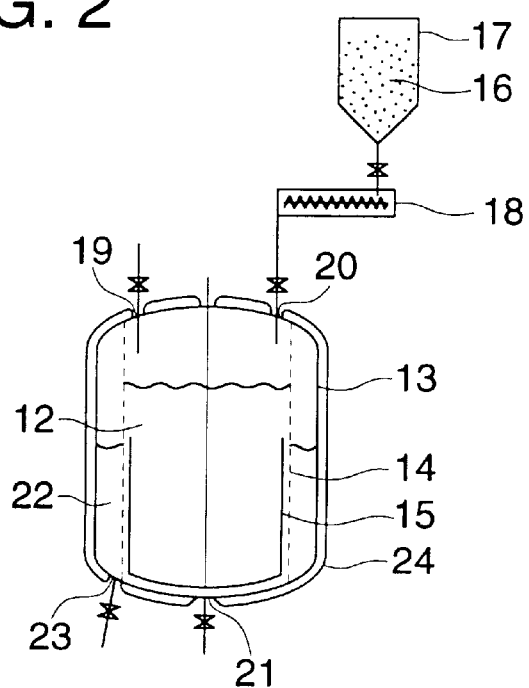
FIG. 2 is a schematic cross section of a mixing process.

The second example of the method for rapid dissolution is described according to FIG. 2. A mixing vessel 13 similar to the mixing vessel 3 in FIG. 1 has a cylindrical mesh 14 (an example of separation means) which is fixed at the bottom of the mixing vessel 13, a stirrer 15, a heat-retaining jacket 24, an organic solvent inlet 19, a cellulose acylate inlet 20, a mixture outlet 21 and a separated organic solvent outlet 23. A swollen mixture 12 can be concentrated by separating the excess organic solvent from the mixture 12 chilled at a temperature of from –100° C. to –10° C. through the mesh 14, and discharging the separated solvent 22 through the mesh outside the system through the organic solvent outlet 23. Any means capable of the separating the organic solvent may be used as the separating means without any limitation, for example a basket-shaped mesh (not fixed) rotating in the reverse direction to that of the stirrer 15 is usable, in addition to the cylindrical mesh 14 fixed in the vessel 13. The size of holes of the mesh may be approximately from 0.1 to 10 mm. The mesh may be vibrated or scrabbled by a scrubber to prevent blocking the mesh. Any means capable of preventing blocking of the mesh can be used without any limitation. It is a characteristic of the invention that the swelling can be performed more rapidly by putting the cellulose acylate into a large amount of the organic solvent whereby the swelling will occur with a high efficiency. The reason for this is that unmixed-in lumps of the cellulose acylate in which the surface of a lump of powder is swollen or dissolved and the interior of the lump remains in the form of powder do not form. As noted above, the excess solvent can then be removed leaving a concentrated mixture. The concentrated mixture is taken out from the mixture outlet 21 and put into a dissolving vessel, not shown in the figure, and dissolved. The mixture may be dissolved in the concentrated state or diluted to the concentration of the dope in the dissolving process. In addition to the above-mentioned example, the chilled organic solvent may be added to the cellulose acylate. In the figure, 16 is the cellulose acylate, 17 is a silo and 18 is a screw-type feeder.

Figure 3:
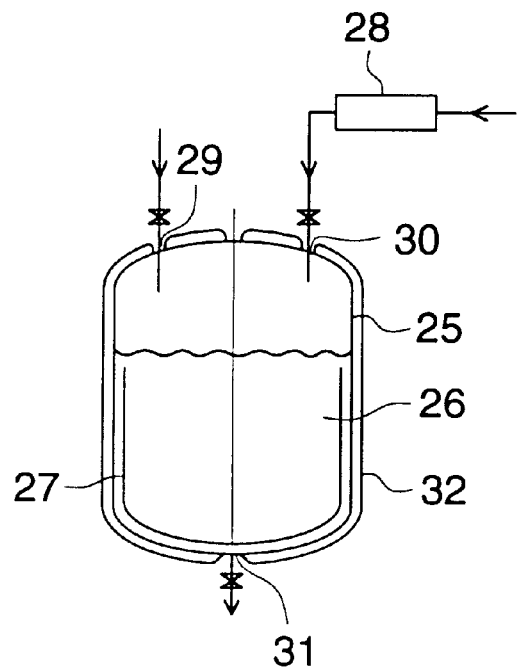
FIG. 3 is a schematic cross section of a dissolving process.

The third example of a method for rapid dissolution is described according to FIG. 3. An organic solvent having the same composition as that of the chilled solvent previously adjusted at a temperature of from 0 to 120° C. by a heat exchanger or warming device 28, is charged into a dissolving, vessel 25 through an organic solvent inlet 30 (the composition of the organic solvent adjusted to from 0 to 120° C. is the same as that of the chilled solvent except when otherwise noted). Thereafter, a mixture swollen at a temperature from –100° C. to –10° C. is put into the dissolving vessel 25 through a mixture inlet 29 to dissolve the mixture. The cellulose acylate is immediately dissolved when the mixture is put into the temperature adjusted organic solvent 26, and the time for dissolution is thereby considerably shortened. The dissolution ability of the cellulose acylate is excellent. There is almost no residue. An additive may be introduced through the organic solvent inlet 30. The dissolved mixture is sent to a storing vessel, not shown in the drawing. The temperature adjusted solvent may be added to the mixture. In the figure, 27 is a stirrer and 32 is a heat-retaining jacket.

Figure 4:
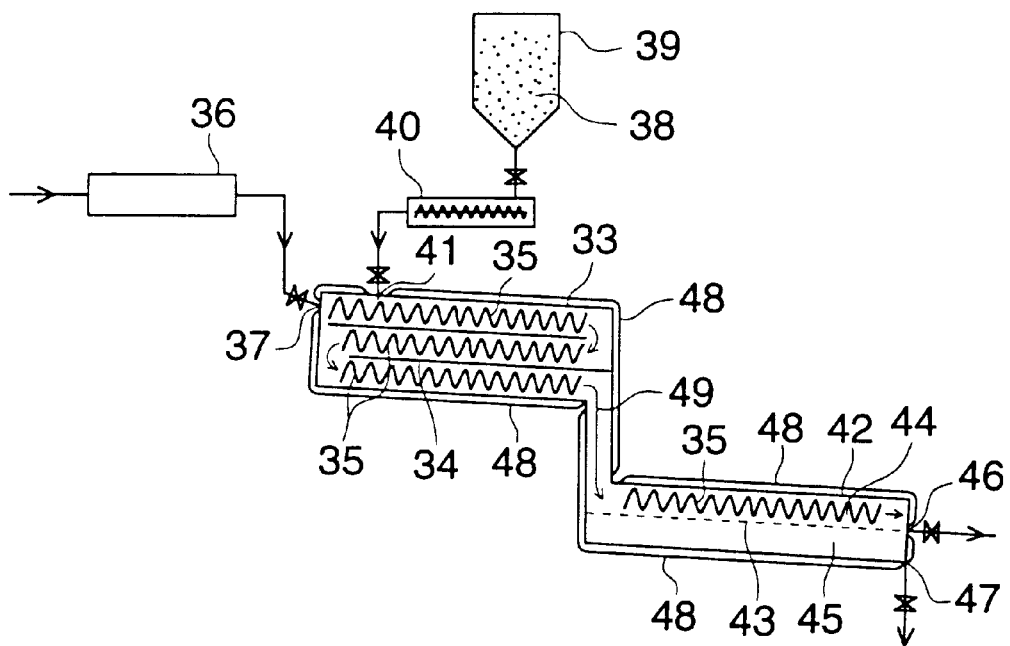
FIG. 4 is a schematic cross section of a continuous mixing process and a continuous organic solvent separating process.

The fourth example of the method for rapid dissolution is described according to FIG. 4. FIG. 4 is a schematic cross section of a continuous mixing process and a continuous organic solvent separating process. An organic solvent chilled at a temperature of from –100° to –10° C. by a chilling device 36 is introduced into an inclined mixing device 33. The organic solvent is transported in the mixing device 33 rotating an in-line mixer 35 (an example of mixture transporting means). Cellulose acylate 38 is sent from a silo 39 by a screw-type feeder 40, and put through a cellulose acylate inlet 41 into the organic solvent being transported in the mixing device 33. The cellulose acylate flows along a partition plate 34 together with the organic solvent transported by the rotating in-line mixer 35. The cellulose acylate is swollen and introduced at the end 49 of the mixing device 33 into an organic solvent separating device 42 which has a mesh 43 as an organic solvent separating means. The mixture 44 is concentrated by separating the excess organic solvent 45 through the mesh 43. The resulting concentrated mixture 44 is taken out from a mixture outlet 46 and put into the next dissolving vessel (not shown in the figure). The separated organic solvent 45 is discharged from an organic solvent outlet 47. The concentrated mixture is dissolved by heating in the dissolving vessel or in a temperature adjusted organic solvent. The introducing speed of the cellulose acylate into the organic solvent being transported may be from 0.5 to 40% by weight, preferably from 1 to 20% by weight, in a momentary concentration. The swelling speed is increased when the concentration is lower, and the efficiency is raised. The flowing speed of the organic solvent is preferably from 0.01 to 5 $m^3$/minute, more preferably from 0.1 to 1 $m^3$/minute. The organic solvent and the mixture can be caused to flow by inclining the mixing device, and it is a considerably preferable example to use a rotating mixing device needing no motive power such as the in-line mixer as shown in FIG. 4. A screw such as that used in an extruder may be used for transportation. The mixing-device may have any shape such as a gutter-shape, a pipe-shape and a box-shape, without any limitation as long as the organic solvent and the mixture can easily flow therein. The mixing device may be a straight-shape, a folded-shape in zigzag or a looped-shape. A heat retaining jacket 48 is preferably attached outside the mixing device. When the shape of the mixing device is zigzag or looped, it is preferably contacted with each other since the heat loss can be inhibited and the efficiency can be raised. A heat retaining jacket 48 is also attached to the organic solvent separating device 42. It is preferred to use an in-line mixer 35 needing no motive power as shown in FIG. 4 to transport a difficultly transported concentrated mixture even though the mixture can be transported by inclining the organic solvent separation device 42. The mixture may be forcibly transported by a screw or a mesh belt on which the mixture is placed and carried and the organic solvent can be separated in the course the carrying. Although the separation may be performed by mesh 43 in the organic solvent separating device 42 as shown in FIG. 4, the separation may be performed by flowing the mixture outside a cylindrical-shaped mesh, or by a device in which the mixture is transported by an in-line mixer or a screw provided in a cylindrical-shaped mesh and the excess organic solvent (not participating in the swelling 45) is separated to the outside of the mesh. The concentrated mixture is sent through the mixture outlet 46 to the dissolving process. Any procedure may be used for dissolving as long as it is a method capable of dissolving, and the mixture may be heated or dissolved in a previously heated organic solvent and diluted.

Figure 5:
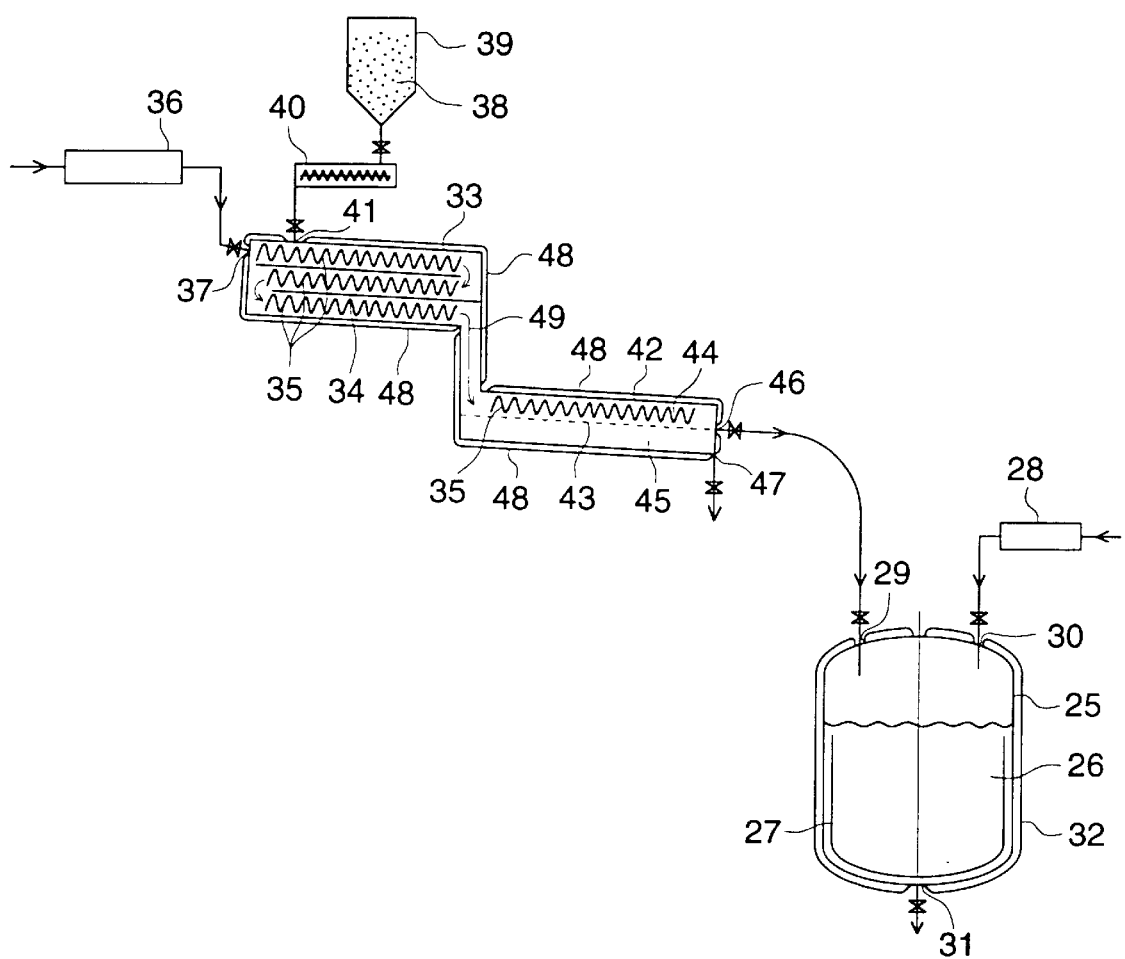
FIG. 5 is a schematic cross section of a continuous mixing process, a continuous organic solvent separating process and a dissolving process

The fifth example of the method for rapid dissolution is described according to FIG. 5. FIG. 5 is a schematic cross section of a continuous mixing process, a continuous organic solvent separating process and a dissolving process. The mixing and the organic solvent separating process are the same as those in FIG. 4, and the dissolving process is the same as that in FIG. 3. The concentrated mixture is transported through a pipe connecting the mixture outlet 46 in FIG. 4 to the mixture inlet 29 in FIG. 3. In the fifth method, the mixture concentrated in the organic solvent separating device 42 is introduced into the dissolving vessel 25 to be dissolved and diluted, in the dissolved vessel 25, the organic solvent controlled at a temperature of from 0 to 120° C. is previously charged. The time for swelling and dissolving can be considerably shortened compared with a usual method. An additive may be introduced through the organic solvent inlet 30.

Figure 6:
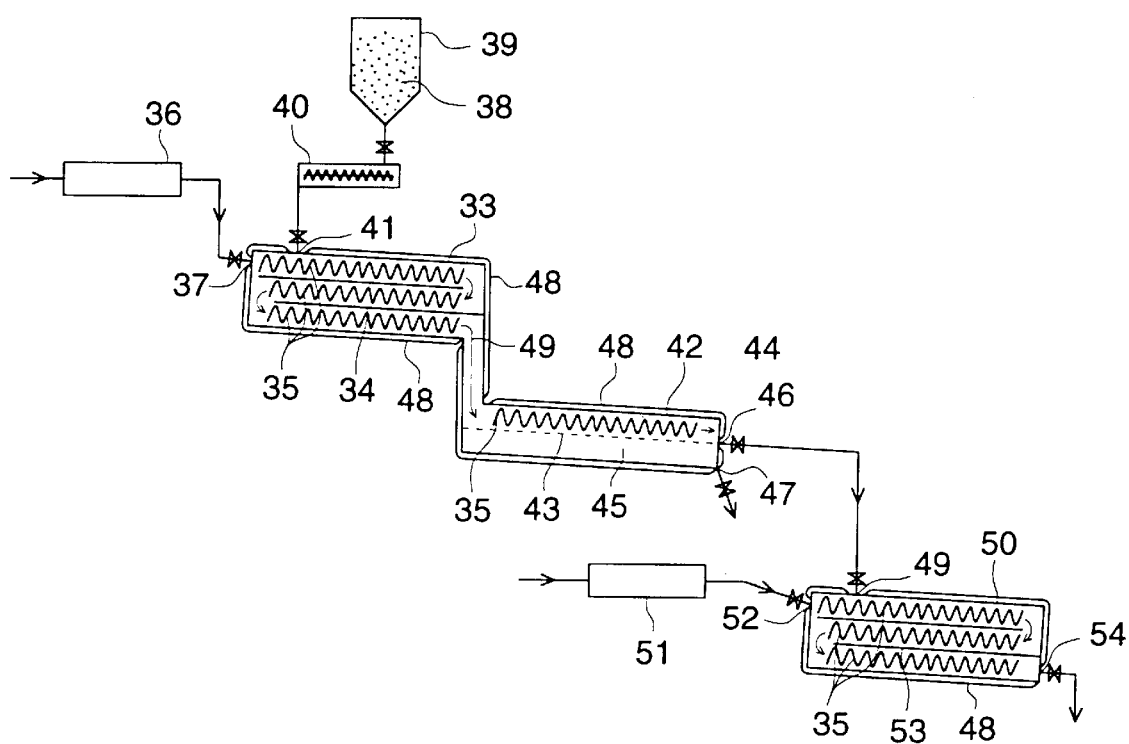
FIG. 6 shows a schematic cross section of a continuous mixing process, a continuous organic solvent separating process and a continuous dissolving process.

The sixth example of the method for rapid dissolution is described according to FIG. 6. FIG. 6 is a schematic cross section of a continuous mixing process, a continuous organic solvent separating process and a continuous dissolving process. The mixing and organic solvent separating processes shown in FIG. 6 are the same as those in FIGS. 4 and 5. The dissolving process shown in FIG. 6 is similar to the mixing process different from the above-mentioned dissolving process. The organic solvent, controlled at a temperature of from 0 to 120° C., is introduced from a heat exchanger (heating device) 51 into a dissolving device 50 through an organic solvent inlet 52 and transported in the dissolving device while rotating with an in-line mixer 35. The mixture 44, which has been concentrated in an organic solvent separating device 42, is introduced through a mixture outlet 46 and a mixture inlet 49, and is dissolved and diluted in the organic solvent being transported and rotated. In the dissolving device 50 in FIG. 6, an in-line mixer similar to that in the mixing device 33 and the organic solvent separating device 42 is installed. The in-line mixer is preferably used in the invention since it has a high efficiency. As above—mentioned, another procedure may be applied. The mixture is completely dissolved and becomes a cellulose acylate solution (hereinafter referred to as dope) by the time it arrives at solution outlet 54. This dope is sent to the second storing vessel, not shown in the figure, through the solution outlet 54. 53 is a partition plate.

Figure 7:
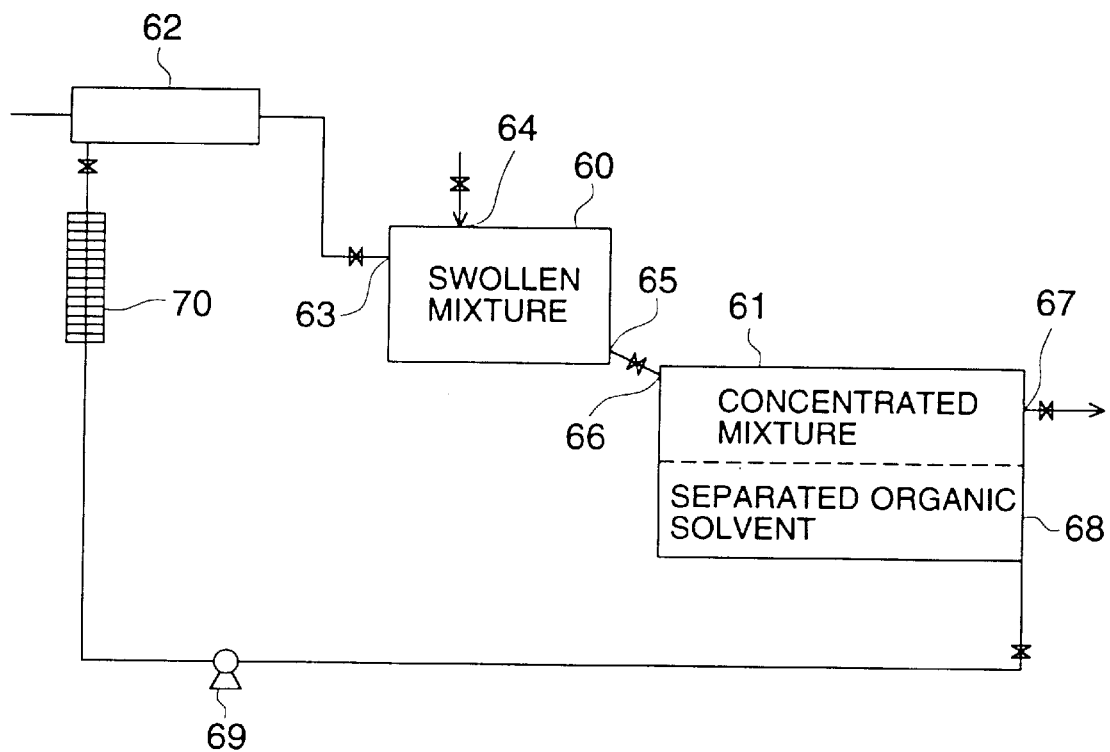
FIG. 7 is a schematic drawing of a recycle process of separated organic solvent.

The seventh example of the method for rapid dissolution is described according to FIG. 7. FIG. 7 is a schematic drawing of the recycling of the separated organic solvent. A mixing device 60 for making a swollen mixture and an organic solvent separating device 61 are the same as the mixing device 33 and the organic solvent separating device 42 in FIGS. 4, 5 and 6, respectively. The organic solvent chilled by a chilling device 62 is introduced into a mixing device 60 through an organic solvent inlet 63. Cellulose acylate is introduced through a cellulose acylate inlet 64 and mixed. The prepared mixture is introduced into an organic solvent separating device 61 through a mixture outlet 65 and a mixture inlet 66, and a part of the organic solvent is separated to concentrate the mixture. The concentrated mixture is sent to the next dissolving process. The separated organic solvent is taken out through an organic solvent outlet 68 and sent to a filter 70 by a pump 69. The organic solvent is sent to a chilling device 62 after removing impurities by the filter and reused.

Another dissolving method is a high pressure dissolving method. The cellulose acylate of the invention is added and mixed with the mixed organic solvent of the invention composed of methyl acetate and another non-chlorinated solvent; and the mixture is put under a high pressure which is then released, whereby the dope is prepared.

To prepare the mixture, the above-mentioned procedure using chilling dissolving can be applied. First, the cellulose acylate is gradually added while stirring to the mixed organic solvent of the invention at room temperature. At this step, the cellulose acylate is in a swollen state in the mixture with the solvent. Next, the mixture is put under a high pressure. The effect of the pressure is observed at a pressure of not less than 50 kgf/$cm^2$. Although the dissolving time can be shortened when the pressure is higher, a sufficient effect can be obtained by a pressure of up to 4000 kgf/$cm^2$ since excessively large equipment is necessary for applying a higher pressure and the incremental effect of the shortening of dissolving time is gradually reduced. After applying the high pressure for a prescribed time, the pressure is released and the mixture is kept under a pressure of from 0.1 to 10 kgf/cm². Thus the cellulose acylate is dissolved in the solvent and an uniform solution can be obtained. The time that the mixture is subjected to high pressure is not especially limited and is preferably 1 to 5 minutes. The applying and releasing of high pressure may be repeated to accelerate the dissolving speed. Sufficient dissolving can be judged by visual observation on the appearance of the solution. Any vessel is usable without any limitation for dissolving as long as the vessel has sufficient strength to bear the high pressure. The treatment by the high pressure may be applied by a batch process using a sealed container prepared by an aluminum foil or a continuous process using a single or double axis extruder or a kneading machine. The dissolving time can be further shortened when the mixture is chilled at the pressure applying step and heated at the pressure releasing step. The concentration of the cellulose acylate is preferably as high as possible from the viewpoint of a drying efficiency at the casting of the film. On the other hand, the viscosity of the solution becomes too high and the flatness of the film is degraded when the concentration is excessively raised. Accordingly, the concentration of the cellulose acylate solution is preferably within the range of from 10 to 40% by weight, more preferably from 15 to 35% by weight.

The vessel may be filled by an inactive gas such as nitrogen gas to inhibit. The viscosity of the cellulose acylate solution is within the range capable of being cast at the film formation usually preferably within the range of from 5 to 500 pois.

Various kinds of additive may be added, as required, into the dope of the invention in the course of preparation thereof. The additives may be added at any time during the preparation of the dope. A plasticizer for raising the mechanical strength and giving the water resistivity, a colorant or UV absorbent for preventing the light-piping are preferably added to the cellulose acylate film to be used for a silver halide photographic material. An antioxidant for giving resistivity to heat and moisture is preferably added in the film for liquid crystal image displaying equipment.

A phosphoric acid ester, a carboxylic acid ester and a glycolic acid ester are preferably used as the plasticizer. Examples of phosphoric acid ester include triphenyl phosphate, tricresyl phosphate, cresylphenyl phosphate, octyldiphenyl phosphate, diphenylbiphenyl phosphate, trioctyl phosphate and tributyl phosphate. Examples of the carboxylic acid ester include dimethyl phthalate, diethyl phthalate, dibutyl phthalate, dioctyl phthalate, diethylhexyl phthalate, acetyltriethyl citrate, acetyltributyl citrate, butyl oleate, methylacety ricinolate, dibutyl sebacate, and a trimelitic acid ester. Examples of the glycolic acid ester include triacetin, tributyline, butylphthalylbutyl glycolate, ethylphthalylethyl glycolate, methylphthalylethyl glycolate, and butylphthalylbutyl glycolate. Among them, triphenyl phosphate, tricresyl phosphate, cresylphenyl phosphate, tributyl phosphate, dimethyl phthalate, diethyl phthalate, dibutyl phthalate, dioctyl phthalate, diethylhexyl phthalate, triacetin, and ethylphthalylethyl glycolate are preferred. Triphenyl phosphate, diethyl phthalate and ethylphthalylethyl glycolate are particularly preferred. These plasticizers may be used singly or in combination of two or more kinds. The adding amount of the plasticizer is preferably within the range of from 5% to 30% by weight, more preferably within the range of from 8% to 16% by weight. The plasticizer may be added at the step of preparation of the cellulose ester solution together with the cellulose ester and the solvent, or in the course of preparation or after preparation of the solution.

Moreover, a compound represented by the following Formula (I), (II) or (III) may be added.

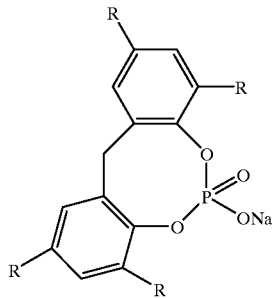

Formula (I)

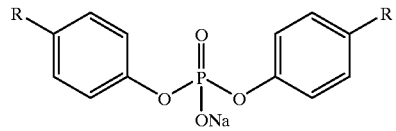

Formula (II)

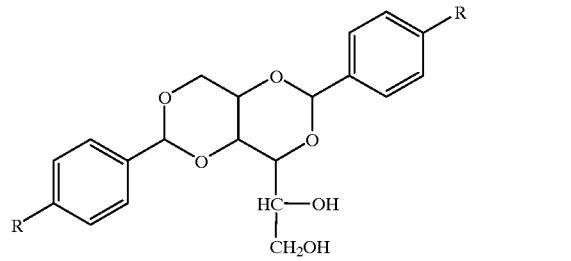

Formula (III)

In the formulas (I), (II) and (III), R is an alkyl group having 1 to 4 carbon atoms. Examples of the compound represented by Formula (I), (II) or (III), include sodium salt of 2,2'-methylenebis(4,6-di-t-butylphenyl)phosphate ((Adecastub NA-10, manufactured by Asahi Electro-Chemical Co. Ltd.) and bis(p-ethylbenzilidene)sorbitol (NC-4, manufactured by Mitsui-Toastu Co. Ltd.).

A compound represented by the following Formula (IV) is used as the antioxidant.

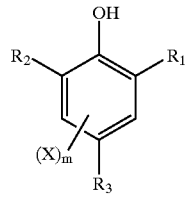

Formula (IV)

In Formula (IV), $R_1$ is an alkyl group, $R_2$, $R_3$ and X are each independently a hydrogen atom, an alkyl group, an alkenyl group, an aryl group, a heterocyclic group, an alkoxyl group, an alkenoxy group, an aryloxy group, an alkylthio group, an alkenylthio group, an arylthio group, a heterocyclic oxy group, a hydroxy group, an amino group, a carbamoyl group, a sulfamoyl group, an alkoxycarbonyl group, an aryloxycarbonyl group, a halogen atom, a nitro group, a cyano group, an acyl group, or an acyl group. m is an integer of from 0 to 2. $R_2$, $R_3$ and X may be the same or different from each other. The above-mentioned alkyl group includes, for example, a straight-chain, a branched-chain and a cyclic alkyl group such as a methyl group, an ethyl group, a propyl group, an iso-propyl group, a tert-butyl group, a cyclohexyl group, a tert-hexyl group, a tert-octyl group, a dodecyl group, a hexadecyl group, an octadecyl group, and a benzyl group. The above-mentioned alkenyl group includes, for example, a straight-chain, a branched-chain and a cyclic alkenyl group such as a vinyl group, an allyl group, a 2-pentenyl group, a cyclohexenyl group, a hexenyl group, a dodecenyl group, and an octadecenyl group. The aryl group includes, for example, an aryl group having a benzene ring or a condensed rings such as a phenyl group, a naphthyl group, and an anthranyl group. The heterocyclic group includes a five- to 7-member ring containing at least one of a nitrogen atom, a sulfur-atom and an oxygen atom such as a furyl group, a pyrrolyl group, an imidazolyl group, a pyridyl group, a purinyl group, a cromanyl group, a pyrrolydyl group, and a morphoryl group. Among them, a hindered phenol compound is preferable. Preferable examples of such the compound include 2,6-di-butyl-p-cresol. pentaerythlytyl-tetrakis[3-(3,5-di-t-butyl-4-hydroxy-phenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylene-bis(3,5-di-t-butyl-4-hydroxy-hydrocinnamido), 1,3,5-trimethyl-2,4,6-tris(3,5-di-t-butyl-4-hydroxy-benzyl)benzene, and tris-(3,5-di-t-butyl-4-hydroxybenzyl)-isocyanulate. In the above-mentioned, 2,6-di-t-butyl-p-cresol, pentaerythlytyl-tetrakis[3-(3,5-di-t-butyl-4-hydroxyphenyl)propionate], and triethylene glycol-bis[3-(3-t-butyl-5-methyl-4-hydroxyphenyl)propionate] are mostly preferred. A hydrazine type metal inactivating agent such as N,N-bis[3-3,5-t-butyl-4-hydroxyphenyl)propionyl] hydrazine, and a phosphor-containing processing stabilizing agent such as tris(2,4-di-t-butylphenyl)phosphite may be used in combination. The adding amount of such the compounds is preferably from 1 ppm to 1.0%, more preferably from 10 ppm to 1000 ppm, by weight.

Examples of the colorant for preventing the light-piping include a compound represented by the following Formula (V) or (IV).

Formula (V)

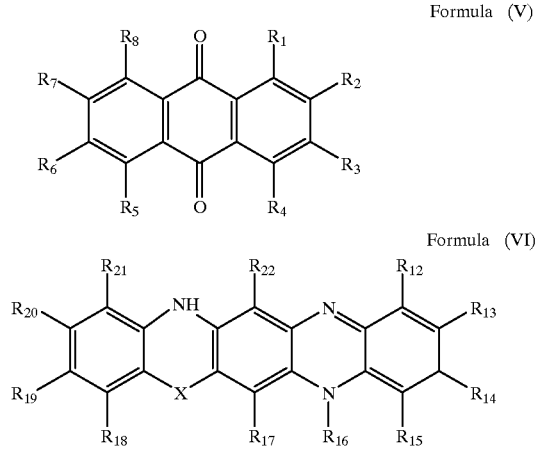

Formula (VI)

In Formulas (V) and (VI), X is an oxygen atom or >NR$_{23}$. R$_1$ to R$_8$ and R$_{12}$ to R$_{23}$ are each a hydrogen atom, a hydroxyl group, an aliphatic group, an aromatic group, a heterocyclic group, a halogen atom a cyano group, a nitro group, —COR$_9$, —COOR$_9$, —NR$_9$R$_{10}$, —NR$_{10}$COR$_{11}$, —NR$_{10}$SO$_2$R$_{11}$, —CONR$_9$R$_{10}$, —SO$_2$NR$_9$R$_{10}$, —COR$_{11}$, —SO$_2$R$_{11}$, —OCOR$_{11}$, —NR$_9$CONR$_{10}$R$_{11}$, —CONHSO$_2$R$_{11}$, or —SO$_2$NHCOR$_{11}$. R$_9$ and R$_{10}$ are each a hydrogen atom, an aliphatic group, an aromatic group, a heterocyclic group, and R$_{11}$ is an aliphatic group, an aromatic group or a heterocyclic group.

Examples of the group represented by R$_1$ through R$_{23}$ include an alkyl group having from 1 to 20 carbon atoms such as a methyl group, an ethyl group, an n-butyl group, an isopropyl group, a 2-ethylhexyl group, an n-decyl group and an n-octadecyl group, a cycloalkyl group having from 1 to 20 carbon atoms such as a cyclobenzyl group and a cyclohexyl group, and an allyl group. These groups each may further has a substituent such as a halogen atom, a hydroxyl group, a cyano group, a nitro group, a carboxyl group, an aryl group having from 6 to 10 carbon atoms, an amino group having from 0 to 20 carbon atoms, an amido group having from 1 to 20 carbon atoms, a carbamoyl group having from 1 to 20 carbon atoms, an ester group having from 1 to 20 carbon atoms, an alkoxyl group or an aryloxyl group each having from 1 to 20 carbon atoms, a sulfonamido group having from 1 to 20 carbon atoms, a sulfamoyl group having from 0 to 20 carbon atoms or a 5- or 6-member heterocyclic group. The aromatic group represented by R$_1$ through R$_{23}$ are each an aryl group having from 6 to 10 carbon atoms such as a phenyl group and a naphthyl group. Such group further may have the foregoing groups described as the substituent of the aliphatic group or an alkyl group having from 1 to 20 carbon atoms such as a methyl group, an ethyl group, an n-butyl group, a t-butyl group and an octyl group as a substituent. The heterocyclic group represented by R$_1$ through R$_{23}$ includes a 5- or 6-member heterocyclic group. The heterocyclic group may have a group as a substituent which is described as the substituent of the foregoing aromatic group. Preferable examples of the compound represented by Formula (V) or (VI), (V-1) to (V-25) and (VI-1) to (VI-4) are shown below.

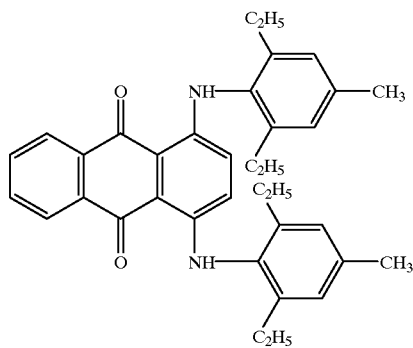

(V-1)

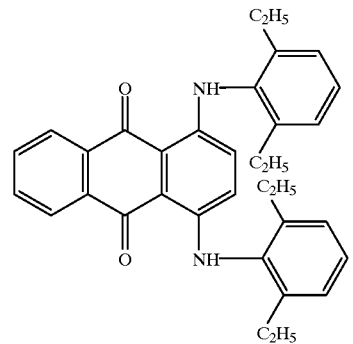

(V-2)

-continued
(V-3)
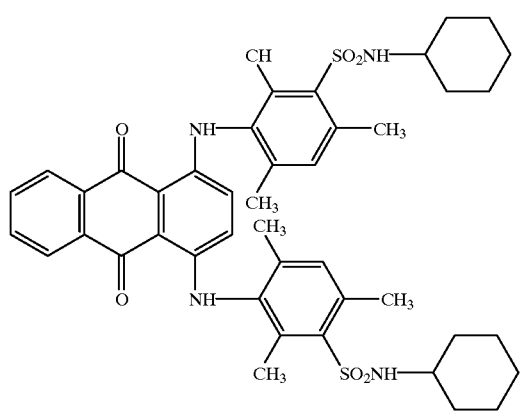
(V-4)
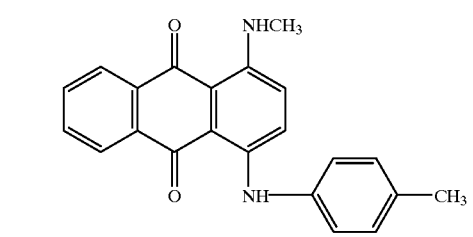
(V-5)
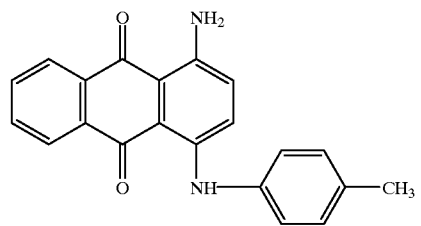
(V-6)
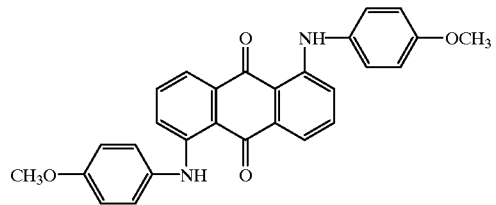
(V-7)
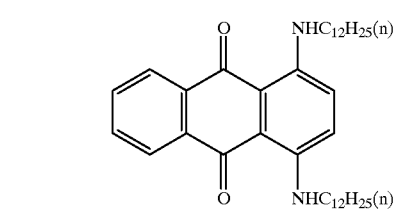
(V-8)
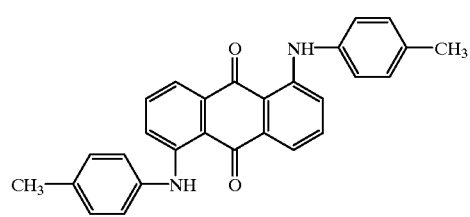
-continued
(V-9)
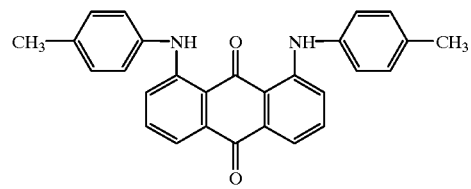
(V-10)
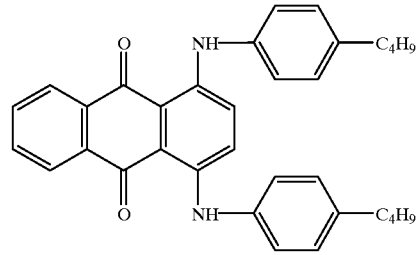
(V-11)
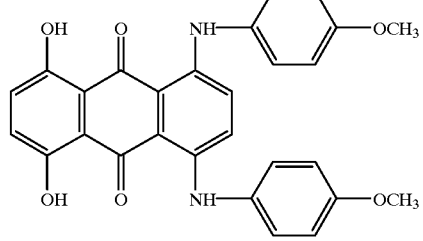
(V-12)
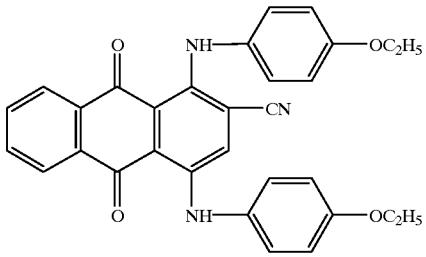
(V-13)
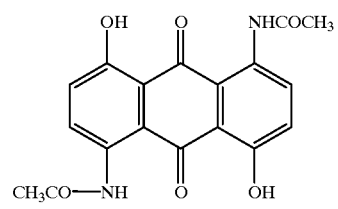
(V-14)
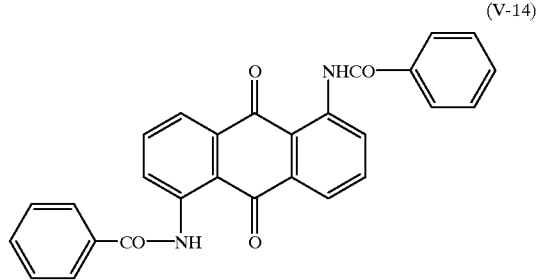

-continued
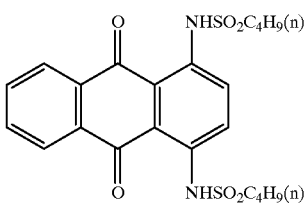 (V-15)
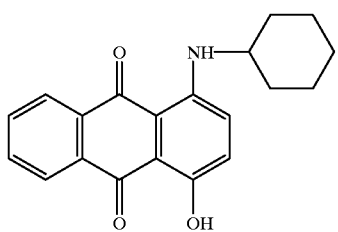 (V-16)
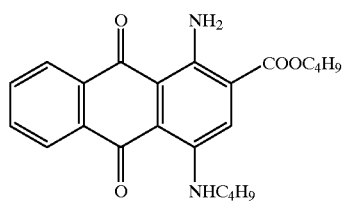 (V-17)
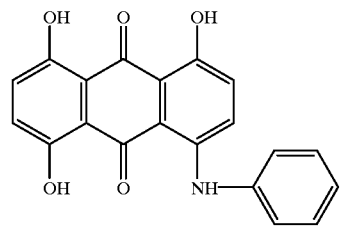 (V-18)
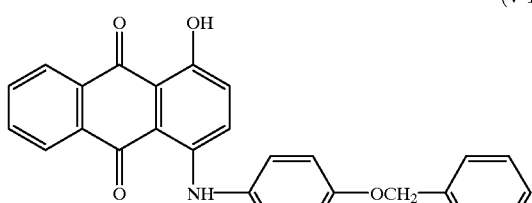 (V-19)
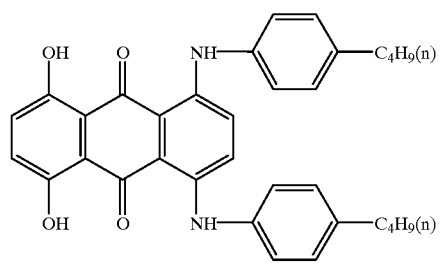 (V-20)
-continued
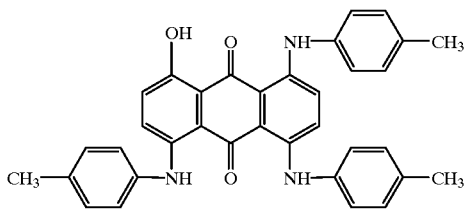 (V-21)
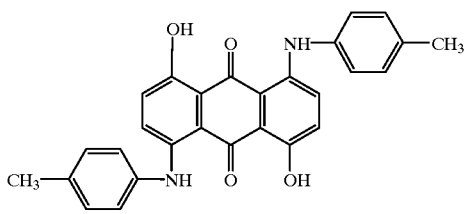 (V-22)
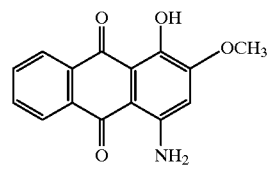 (V-23)
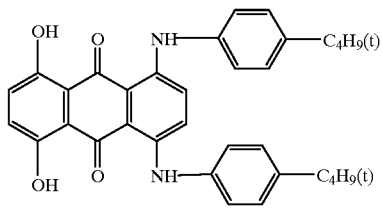 (V-24)
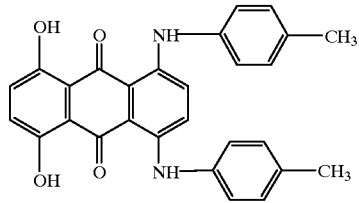 (V-25)
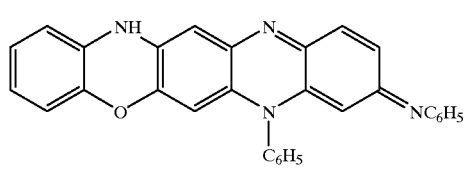 (VI-1)
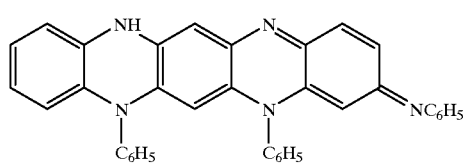 (VI-2)

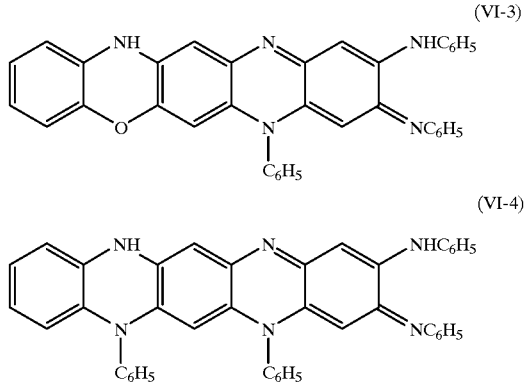

The amount of the colorant to be added is preferably within the range of from 10 ppm to 1000 ppm, more preferably from 50 ppm to 500 ppm, in the ratio to the cellulose ester by weight. Light-piping can be inhibited and the yellowish color of film can be improved by the addition of such colorant to the cellulose ester film. These compounds may be added together with the cellulose ester and the solvent at the preparation of the cellulose ester solution, or in the course or after the preparation of the solution.

Various kinds of additive may be added to the cellulose ester solution of the invention at any step of the preparation of the solution, namely before through after the preparation. Such additives include inorganic particles such as that of kaolin, talc, diatomaceous earth, quartz, calcium carbonate, barium sulfate, titanium oxide and alumina, a thermal stabilizing agent such as a salt of alkali-earth metal, for example, calcium and magnesium, an antistatic agent, a flame retarder, a lubricant and an oil.

It is preferable to remove foreign substances such as non-dissolved residue and dust by an appropriate filter such as a metal mesh or flannel in advance of casting.

Figure 8:
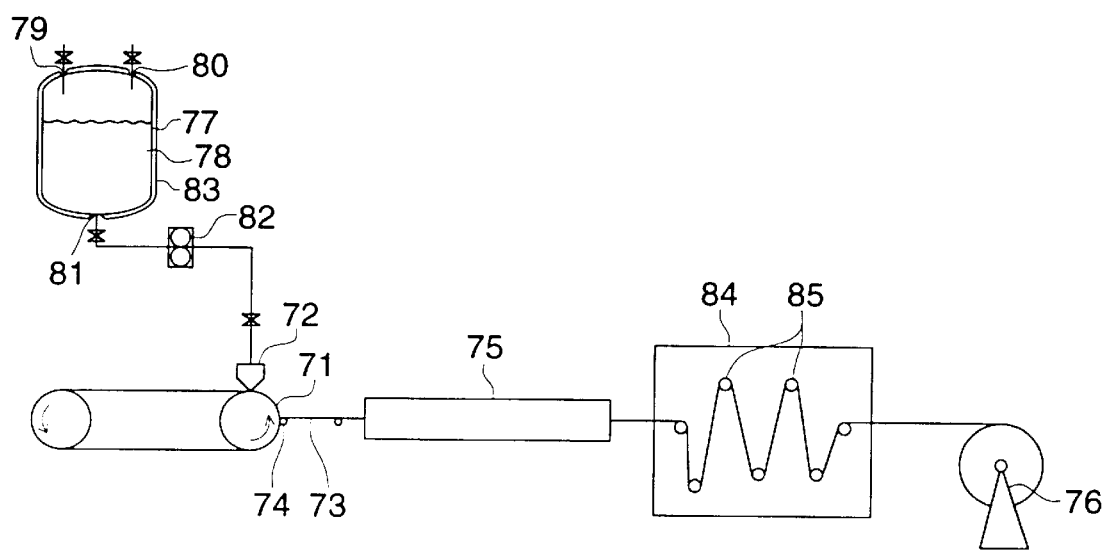
FIG. 8 is a schematic cross section of a solution casting film forming process.

The method for forming a film using the cellulose ester solution of the invention is described below. A solution casting film forming method and a casting film forming equipment usually used for forming a cellulose triacetate film are used as the method and equipment for forming the cellulose acylate film of the invention. The solution casting film forming method and the equipment are simply described according to FIG. 8 which shows a schematic cross section of the solution casting film forming equipment. The dope or cellulose acylate solution prepared in the foregoing dissolving vessel is first stored in a storing vessel 77 and subjected to defoaming and final preparation. The dope 78 is sent to an extrusion die 72 from a dope outlet 81 by, for example, a pressure applying quantitative gear pump capable of precisely controlling the dispensed amount of solution by the number of rotations thereof. The dope is uniformly cast through the slit of the die 72 on a substrate 71 which is continuously run. The layer of half dried dope, hereinafter referred to as web, is peeled from the substrate at a point at which the substrate is approximately once rotated. The web 73 is transported by a tenter 75 and dried while the width of the web is maintained by holding both sides of the web 73 by clips. Then the web is transported by a group of rollers 85 of a drying equipment 84 to complete the drying, and the dried film is wound by a winder 76 in a prescribed length. In the figure, 79 is a dope inlet, 80 is an additive inlet and 83 is a heat retaining jacket. The combination of the tenter and the drying equipment having the group of rollers may be changed according to the object thereof. In the solution casting film forming method for a film to be used for a silver halide photographic light-sensitive material, a coating apparatus for treating the surface of film such as providing a subbing layer and a protective layer, an antistatic layer, or an antihalation layer, is frequently attached other than the apparatus shown in FIG. 8.

Casting methods advantageously applied in the invention include a method in which the prepared dope is uniformly cast onto a substrate through the pressure applied die, a method using a blade in which the thickness of the dope layer cast on the substrate is adjusted by a blade, and a method using a reversal roller coater in which the thickness of dope layer cast on the substrate is adjusted by a roller rotating in reverse. Among them, the method using the pressure applied die is preferable. Examples of the pressure applied die preferably include a coat hanger type and a T-die type. Other than the above-mentioned, for example, methods described in the following publications can be preferably used; JP O.P.I. Nos. 61-94724, 61-148013, 4-85011, 4-286611, 5-185443, 5-185445, 6-278149 and 8-207210. The effects described in each of the publications can be obtained by setting conditions corresponding to the difference of the boiling point of solvents to be used.

A drum having a mirror surface finished by chromium plating or a belt or a band of stainless steel having a mirror surface finished by polishing is used as the endless substrate for producing the polyester film.

One or two or more pressure applied dies may be installed for producing the cellulose ester film of the invention. One or two dies are preferably used. When two or more dies are used, the cast amount of the dope may be divided in various ratios by supplying through plural precise quantitative pump in each ratio, respectively.

In the production of the cellulose film according to the invention, the dope cast on the substrate may be dried by various methods, for example, a method in which hot air is blown to the surface of the drum or belt, in other words, from the side of the web cast on the substrate, a method in which hot air is blown to the back of the drum or belt, and a liquid heat conduct method in which a liquid controlled in temperature heats the back side of the belt or drum for controlling the surface temperature of it. The back side liquid heat conduct method is preferably used.

The surface temperature of the substrate before casting of the dope may be any temperature lower than the boiling point of the solvent used in the dope. However, it is preferred that the temperature is set within the range of from 1° C. to 10° C. lower than the boiling point of the solvent having the lowest boiling point among the solvents used in the dope for accelerating the drying and setting of the dope on the substrate.

The production speed of the cellulose ester film is practically decided by the remaining amount of solvent at the time of peeling the formed web from the drum or the belt, even though the speed is varied depending on the diameter of drum, the length of belt, the procedure of drying and the composition of the dope. When the solvent concentration in the dope near the surface of the drum or belt, in the direction of the thickness of the dope layer, is too high, the dope remains on the drum or the belt after the web is peeled. Having dope remaining on the substrate should be avoided since the casting of the dope is disturbed. Moreover, the formed web has to have sufficient strength to withstand the peeling force. The remaining amount of the solvent at the peeling point is varied depending on the drying procedure, and the remaining amount can be more effectively decreased by using the drying method by conducting heat from the back side of the drum or the belt compared with the method of blowing air to the surface of the dope.

As the film drying method relating to the production of the cellulose acylate film of the invention, the drying method of the above-mentioned solution casting film forming method is preferable. The drying is performed by a method in which air, having a prescribed temperature, is blown against both sides of the web or a method using a heating means such as microwave. It is preferable that the drying is performed initially at a low temperature so as to form no foam at the initial period of drying (rapid drying causes degradation of the flatness of film). High temperature can be used after drying has progressed.

In the course of drying after peeling from the substrate, the film tends to shrink in the direction of width with the evaporation of the solvent. The shrinkage is increased by drying at a high temperature. It is preferable for increasing the flatness of the finished film that the drying is performed while inhibiting the shrinkage to as little as possible. The method, for example, described in JP O.P.I. No. 62-46625 (tenter method) is preferable from such viewpoint, in which the web is dried while both sides of web are held in the width direction in all or part of the course of drying.

Moreover, a method which increases the width of the film can be employed. For example, the expanding methods described in JP O.P.I. Nos. 62-115035, 4-152125, 4-284211 and 4-298310 are applicable in the invention.

The drying temperature in the drying process of the cellulose acylate film of the invention is preferably from 40 to 250° C., more preferably from 70 to 180° C. The temperature, the amount of air and time for drying are varied depending on the kind of the solvent, and these conditions may be optionally decided according to the kind and the combination of the solvents. The remaining amount of solvent in the finished film is preferably not more than 2% by weight, more preferably not more than 0.4% by weight for obtaining a film having a high dimension stability.

The process from the casting to the drying may be performed in the atmosphere of air or an inactive gas such as nitrogen gas.

A usual winder may be used as the winder used in the production of the cellulose acylate film of the invention. The film can be wound by a constant tension method, a constant torque method, a taper tension method, and a programmed tension control method with a constant interior stress.

The thickness of the cellulose film relating to the invention after finished or after dried is usually 5 to 500 μm even though the thickness may be changed according to the use of the film. The thickness may be within the range of from 40 to 250 μm, furthermore, within the range of from 50 to 125 μm. The thickness of the film can be adjusted by controlling the concentration of the solid composition in the dope, the slit space of the die, the extruding pressure from the die and the speed of the substrate so that the thickness is made to the prescribed value.

<Determination Method of Substitution Degree of Acyl Group>

1) Substitution Degree of Acyl Group in Cellulose Acylate:

The substitution degree of acyl group is determined by a saponification method:

Dried cellulose ester is exactly weighed and dissolved in a mixture solvent composed of 70 ml of acetone and 30 ml of methyl sulfoxide, and 50 ml of acetone is further added. The cellulose acylate is saponificated for 2 hours at 25° C. after addition of 30 ml of a 1N sodium hydroxide solution. Then the excessive sodium hydroxide is titrated by a 1N sulfuric acid solution with a concentration factor F using phenolphthalein as a indicator. A blank test is carried out in the same manner as above. After the titration, the top clear liquid of the titrated solution is diluted by 100 ml and the organic acid composition of the solution was determined by an ordinary method using an ion chromatography. The substitution degree of acyl group are calculated from the result of the titration and the acid composition analysis of the ion chromatography by the followings.

$$T[A+B]=(E-M)\times F/(1000\times W)$$

$$A=\{162.14\times T[A+B]\}/\{1-42.14\times T[A+B]+(1-56.06\times T[A+B])\times(Cb/Ca)\}$$

$$B=A\times(Cb/Ca)$$

wherein

T [A+B]: The total amount of organic acid in moles/g

E: Titration amount in the blank test in ml

M: Titration amount of the sample

F: Factor of the 1N sulfuric acid solution

W: Weight of the sample

Ca: Amount of acetic acid in moles measured by the ion chromatography

Cb: Amount of organic acid having from 3 to 5 carbon atoms in moles measured by the ion chromatography Cb/Ca: Mole ratio of the organic acid other than acetic acid to acetic acid A: Substitution degree of acetyl group B: Substitution degree of acyl group having from 3 to 5 carbon atoms 2) Viscosity Average Polymerization Degree DP About 0.2 g of absolutely dried cellulose acylate is exactly weighed and dissolved in 100 ml of a mixture solvent of methylene chloride and ethanol in a weight ratio of 9:1. The falling time in second is measured at 25° C. by an Ostwald viscometer and the polymerization degree is determined by the following equations.

$$\eta_{rel}=T/Ts$$

$$[\eta]=(\ln\eta_{rel})/C$$

$$DP=[\eta]/Km$$

wherein

T: The falling time in second of the sample

Ts: The falling time in second of the solvent

C: The concentration of the cellulose ester in g/l

T: A constant of $6\times10^{-4}$.

The remaining amount of the solvent in the film is measured a s follows.

Sample of film or web U is put into a weighing vessel and exactly weighed. Then the film or web is heated at 150° C. for 3 hours. After that, the sample is chilled by room temperature so as to absorb no moisture,and weighed. The remaining amount of solvent is calculated as follows according to the weight D of the absolutely dried film or web.

Remaining solvent amount (%)={(U–D)/D}×100

EXAMPLES

The invention is described in detail according to examples. The embodiment of the invention is not limited to the examples.

<Preparation Procedure for Preparing Various Kinds of Cellulose Acylate Different from each other in the Alkali-earth Metal Content by Removing Alkali-earth Metal Compound>

Various kinds of cellulose acylate were prepared by varying the amount of cellulose acylate, glacial acetic acid and water according to the description in the foregoing Japanese Patent No. 61-40095, column 5, lines 33–38.

<Determination of Content of Alkali-earth Metal in Cellulose Acylate>

The quantity of alkali-earth metal was measured by ICE-AES (inductively coupled plasma atomic emission spectrometer). Five milliliter of sulfuric acid was added to approximately 500 g of the cellulose ester and the mixture was subjected to microwave decomposition for a time of from several minutes to several times ten minutes. Then 4 ml of nitric acid was added to the mixture and the mixture was further subjected to microwave decomposition. Finally the mixture was decomposed by microwave after addition of 1 ml of nitric acid. This decomposition procedure is called micro-digest wet decomposition method. Several milliliter of thus obtained decomposition product was dissolved in water and analyzed by ICP-AES using SPS-4000 manufactured by Seiko Densi Co. Ltd.

<Turbidity and Transparency of Dope>

A dope or solution of cellulose acylate was put into a transparent vessel and the turbidity and the transparency of the solution were visually observed. The results of the observation were classified according to the following ranks.

A: A dope transparent and uniform.

B: A dope clear with a slight turbidity.

C: A dope having a little turbidity and milky-white.

D: A dope having a considerable turbidity and a lowered transparency. Fine particles are observed other than the turbidity.

<Haze of Film>

The haze was measured by a haze meter (1001DP, manufactured by Nihon Densyoku Kogyo Co., Ltd., according to JIS K-6714.

[Tear strength]

The film was conditioned for 4 hours in a room conditioned at a temperature of 23° C. and a relative humidity of 55%, and cut in a size of 50 mm×64 mm. The tear strength of the sample was measured according to ISO 6383/2-1983.

Example 1

In a dissolving vessel, 100 parts by weight of cellulose triacetate having a substitution degree of 2.78, a viscosity average polymerization degree of 300 and an alkali-earth metal, content showing Table 1 was mixed with a mixed solvent containing 10 parts by weight of triphenyl phosphate, hereinafter referred to TPP, as a plasticizer, 280 parts by weight of methyl acetate and 120 parts by weight of acetone and swollen at room temperature. The swollen mixture was chilled to −70° C. by chilling from outside the vessel, and kept for 1 hour. Thereafter, the mixture was heated by 45° C. by heating from outside of the vessel and kept for 30 minutes. The chilling and heating were repeated 3 times to prepare a dope. The dope was kept at 30° C. for one night to remove foams and filtered by Azumi Filter Paper No. 244 manufactured by Azumi Roshi Co., Ltd. The dope thus obtained was sent to a die by a quantitative gear pump and a cellulose triacetate film was prepared by the solution casting film forming method such as that shown in FIG. 8. Namely, the dope is cast from the die onto a stainless steel belt endlessly run so that the thickness after drying was 120 μm. The web is dried on the belt which was thermally controlled by contacting the back side thereof with water warmed to 50° C., in the first half of the drying process, and dried by blowing dried air of 90° C. in the latter half of the drying process. The web is peeled from the belt at a point at which the belt was about once rotated. Then the web was dried at 120° C. for 5 minutes while holding both sides of the web by clips, and further dried through a group of rollers at 140° C. for 20 minutes. Thus a cellulose triacetate film having a thickness of 120 μm was finally obtained. The amount of remaining solvent of each of the samples was 0.9%.

Example 2

Using a mixing vessel shown in FIG. 1, 100 parts by weight of cellulose triacetate having a substitution degree of acetyl group of 2.78, a viscosity average polymerization degree of 300 and a content of alkali-earth metal the same as that in Example 1 was gradually stirred into 500 parts by weight of a mixed organic solvent composed of methyl acetate and acetone with a mixing ratio of 7:3 by weight which was previously chilled at −80° C. in the mixing vessel. The cellulose triacetate was completely swollen after 20 minutes of completion of the addition. The swollen mixture was sent to a dissolving vessel. The swollen mixture in the dissolving vessel was heated to 50° C. and adjusted so that the concentration of the cellulose triacetate was 20% by weight. Furthermore, 10 parts by weight of TPP was added. The mixture was stirred for 40 minutes. Thus the swollen mixture was dissolved and a clear dope was obtained. A cellulose triacetate film having a thickness of 120 μm was prepared in the same manner as in Example 1. The amount of remaining solvent in the film was 0.8%.

Example 3

Nine hundreds parts by weight of a mixed organic solvent composed of methyl acetate and acetone in a mixing ratio of 7:3 by weight previously chilled at −70° C. was put in a mixing vessel attached with a 5 mm stainless steel mesh shown in FIG. 2. One hundred parts by weight of cellulose acetate propionate having a substitution degree of acetyl group of 2.71 and that of propionyl group of 0.17, a viscosity average polymerization degree of 350, and a content of alkali-earth metal listed in Table 1 was gradually added at 30° C. into the chilled organic solvent in the mixing vessel. Twenty minutes after the addition, the cellulose acetate propionate was completely swollen. Excess organic solvent (not contributing to swelling) was removed through the mesh, and the swollen mixture was sent to a dissolving vessel. The dissolving vessel was heated to 50° C. and a mixed organic solvent composed of methyl acetate and acetone in a mixing ratio of 7:3 by weight, previously heated to 50° C. so that the concentration of the cellulose acetate propionate was 20% by weight. Furthermore, 10 parts by weight of PPT was added. The mixture was stirred for 20 minutes. Thus the swollen mixture was dissolved and a clear dope was obtained. A cellulose triacetate propionate film having a thickness of 120 μm was prepared in the same manner as in Example 1. The amount of remaining solvent in the film was 0.9%.

Example 4

Testing was performed using the mixing vessel shown in FIG. 2 and the dissolving vessel shown in FIG. 3. One hundred parts by weight of cellulose acetate propionate having a substitution degree of acetyl group of 2.71 and that of propionyl group of 0.17, a viscosity average polymerization degree of 350 and an alkali-earth metal content the same as in Example 3 was gradually added at 30° C. while stirring into 1000 parts by weight a mixed organic solvent composed of methyl acetate and acetone (mixing ratio was 7:3 by weight), which was previously chilled to −70° C. in the mixing vessel having a 5 mm stainless steel mesh shown in FIG. 2. Twenty minutes after the addition, the cellulose acetate propionate was completely swollen. Six hundred parts by weight of the organic solvent not contributing to the swelling was removed through the mesh, and the swollen mixture was sent to a dissolving vessel. The swollen mixture was put into 200 parts by weight of a mixed organic solvent previously heated at 50° C. in the dissolving vessel, and stirred at 50° C. and dissolved. The mixture was completely dissolved within a period of less than 20 minutes and a dope was obtained. A cellulose acetate propionate film having a thickness of 120 μm was obtained using the dope by a solution casting film forming method the same as in Example 1. The amount of remaining solvent was 0.9%.

Example 5

A continuous mixing device and an organic solvent separating device were used in the test, which were shown in FIG. 4 and FIG. 5, respectively. Cellulose acetate propionate having a substitution degree of acetyl group of 2.71 and that of propionyl group of 0:17, a viscosity average polymerization degree of 350 and a alkali-earth metal content the same as in Example 3 was continuously added at 30° C. into a mixed organic solvent composed of methyl acetate and acetone which was previously chilled at −70° C. and flowed in the mixing device. The added amount is controlled so that the amount the cellulose acetate propionate is 5% by weight of the flowing amount of the solvent per unit of time. Five minutes after the addition, the cellulose acetate propionate was completely swollen at the end of the mixing device. The addition was completed in ten minutes. Accordingly, the time for swelling was 15 minutes. The swollen mixture was introduced into the organic solvent separating device having a 1 mm stainless steel mesh to separate the excess organic solvent. Thus the concentrated mixture was sent to a dissolving vessel. Sixty percent of the used organic solvent was recovered by the separation. The concentrated mixture was continuously put into the dissolving vessel in which a solvent having the same composition as the foregoing solvent was previously kept at 50° C., the solvent contained 10% by weight of TPP. The concentrated mixture was immediately dissolved when it was contacted with the organic solvent of 50° C. and a clear dope was formed. A period of ten minutes was required for adding all the concentrated mixture. A cellulose acetate propionate film having a thickness of 120 μm was obtained using the dope by a solution casting film forming method the same as in Example 1. The amount of remaining solvent was 0.9%.

Example 6

A continuous mixing device, an organic solvent separating device and a continuous dissolving device shown in FIG. 6 were used in the test. Cellulose acetate propionate having a substitution degree of acetyl group of 2.71, that of propionyl group of 0.17 and a viscosity average polymerization degree of 350 and an alkali-earth metal content the same as in Example 3 was continuously added at 30° C. into a mixed organic solvent composed of methyl acetate and acetone which was previously chilled at −70° C. and flowed in the mixing device. The added amount is controlled so that the amount of cellulose acetate propionate is 5% by weight of the flowing amount of the solvent in a unit of time. Five minutes after the addition, the cellulose acetate propionate was completely swollen at the end of the mixing device. Accordingly, the time for swelling was 15 minutes. The swollen mixture was introduced into the organic solvent separating device having a 1 mm stainless steel mesh to separate the organic solvent not contributed to swelling. Thus concentrated mixture was sent to a dissolving vessel. The concentration of the cellulose acetate propionate in the concentrated mixture was 40% by weight. The concentrated mixture was put into the dissolving device in which a mixed organic solvent composed of methyl acetate and acetone in a weight ratio of 7:3, previously heated at 50° C. was flowed. The ratio of the concentrated mixture added to the heated organic solvent was 1:1. The concentrated mixture was immediately dissolved after addition and a dope having a concentration of 20% by weight was obtained. The dope was introduced into the storing vessel. A period of ten minutes was required to add all of the mixture. Then 10% by weight of the cellulose acetate propionate of TPP and some organic solvent the same as the foregoing solvent was added to the storing vessel and dissolved by stirring. A cellulose acetate propionate film having a thickness of 120 μm was obtained using the dope by a solution casting film forming method the same as in Example 1. The amount of remaining solvent was 0.9%.

Example 7

In a dissolving vessel, 100 parts by weight of cellulose triacetate having a substitution degree of 2.78 and a viscosity average polymerization degree of 300 and containing an alkali-earth metal (the content of alkali-earth metal was the same as that shown in Table 1) was added to a mixed organic solvent composed of 280 parts by weight methyl acetate, 120 parts by weight of acetone and 10 parts by weight of TPP, and mixed. The cellulose triacetate was swollen at room temperature. The swollen mixture was put into a container having a volume of 1000 ml made of aluminum foil having a thickness of 100 μm so as to fill the container. The container was closed by aluminum foil and sealed so that air could not enter into the container. The sealed container was put in a rubber bag, and the bag was sealed after lightly exhausting air. The rubber bag was set in a static hydraulic pressure applying apparatus, manufactured by Kobe Seiko Co., Ltd., and a pressure of 1000 kg/cm$^2$ was applied while maintaining 20° C. Thereafter, the pressure was released to the pressure of the atmosphere and kept for 30 minutes. The cycle of applying and releasing pressure was repeated 3 times, and a dope was obtained. A cellulose acetate propionate film having a thickness of 120 μm was obtained using the dope by a solution casting film forming method the same as in Example 1. The amount of remaining solvent was 0.9%.

Example 8

A dope was prepared in the same manner as in Example 3 except that the content of alkali-earth metal was fixed at 35 ppm and the amounts of methyl acetate and acetone were changed to 400 parts by weight and 100 parts by weight, respectively. A cellulose triacetate film having a thickness of 120 μm was obtained using the dope by a solution casting film forming method the same as in Example 1. The amount of remaining solvent was 1.0%.

Example 9

A dope was prepared in the same manner as in Example 3 except that the content of alkali-earth metal was fixed at 35 ppm and the ratio of methyl acetate and acetone was changed to 7.5:2.5. A cellulose acetate propionate film having a thickness of 120 μm was obtained using the dope by a solution casting film forming method the same as in Example 1. The amount of remaining solvent was 0.9%.

Example 10

A dope was prepared in the same manner as in Example 5 except that the content of alkali-earth metal was fixed at 35 ppm and the ratio of methyl acetate and acetone was changed to 6.5:3.5. A cellulose acetate propionate film having a thickness of 120 μm was obtained using the dope by a solution casting film forming method the same as in Example 1. The amount of remaining solvent was 0.9%.

Example 11

A dope was prepared in the same manner as in Example 6 except that the content of alkali-earth metal was fixed at 35 ppm and the ratio of methyl acetate and acetone was changed to 6:4. A cellulose acetate propionate film having a thickness of 120 μm was obtained using the dope by a solution casting film forming method the same as in Example 1. The amount of remaining solvent was 0.9%.

Example 12

A dope was prepared in the same manner as in Example 7 except that the content of alkali-earth metal was fixed at 48 ppm and the ratio of methyl acetate and acetone was changed to 6:4. A cellulose triacetate film having a thickness of 120 μm was obtained using the dope by a solution casting film forming method the same as in Example 1. The amount of remaining solvent was 1.0%.

Example 13

A dope was prepared in the same manner as in Example 2 except that the content of alkali-earth metal was fixed at 48 ppm and the substitution degree of acetyl group and the viscosity average polymerization degree were changed to 2.91 and 400, respectively. A cellulose triacetate film having a thickness of 120 μm was obtained using the dope by a solution casting film forming method the same as in Example 1. The amount of remaining solvent was 0.9%.

Comparative Example 1

A dope was prepared in the same manner as in Example 4 except that the content of alkali-earth metal in the cellulose acylate was changed to 135 ppm, 243 ppm or 510 ppm. A cellulose acetate propionate film having a thickness of 120 μm was obtained using the dope by a solution casting film forming method the same as in Example 1. The amount of remaining solvent was 0.9%.

Comparative Example 2

A dope was prepared in the same manner as in Example 7 except that the content of alkali-earth metal in the cellulose acylate was changed to 148 ppm, 234 ppm or 528 ppm. A cellulose acetate propionate film having a thickness of 120 μm was obtained using the dope by a solution casting film forming method the same as in Example 1. The amount of remaining solvent was 0.9%.

Comparative Example 3

A dope was prepared in the same manner as in Example 3 except that the content of alkali-earth metal in the cellulose acylate was changed to 135 ppm, 243 ppm or 510 ppm, and the amounts of methyl acetate and acetone in the organic solvent were changed to 475 parts and 25 parts by weight, respectively. A cellulose acetate propionate film having a thickness of 120 μm was obtained using the dope by a solution casting film forming method the same as in Example 1. The amount of remaining solvent was 1.4%.

Comparative Example 4

A dope was prepared in the same manner as in Example 3 except that the substitution degree of acetyl group and that of propyl group were changed to 2.01 and 0.91, respectively, and the content of alkali-earth metal in the cellulose acylate was fixed at to 135 ppm. A cellulose acetate propionate film having a thickness of 120 μm was obtained using the dope by a solution casting film forming method the same as in Example 1. The amount of remaining solvent was 1.9%.

Results of the evaluation are shown in Tables 1 and 2.

TABLE 1

| No. | Alkali-earth metal (ppm) | Turbidity of dope (level) | Film Haze |
|---|---|---|---|
| Example 1 | 27 | A | 0.4 |
|  | 48 | A | 0.5 |
|  | 74 | B | 0.7 |
| Example 2 | 27 | A | 0.2 |
|  | 48 | A | 0.3 |
|  | 74 | A | 0.5 |
| Example 3 | 19 | A | 0.1 |
|  | 35 | A | 0.2 |
|  | 85 | A | 0.5 |
| Example 4 | 19 | A | 0.1 |
|  | 35 | A | 0.2 |
|  | 85 | A | 0.5 |
| Example 5 | 19 | A | 0.1 |
|  | 35 | A | 0.2 |
|  | 85 | A | 0.5 |
| Example 6 | 19 | A | 0.1 |
|  | 35 | A | 0.2 |
|  | 85 | A | 0.5 |
| Example 7 | 27 | A | 0.5 |
|  | 48 | A | 0.6 |
|  | 74 | B | 0.8 |
| Example 8 | 35 | A | 0.2 |
| Example 9 | 35 | A | 0.2 |
| Example 10 | 35 | A | 0.2 |
| Example 11 | 35 | B | 0.7 |
| Example 12 | 48 | B | 0.7 |
| Example 13 | 48 | A | 0.3 |
| Comparative 1 | 135 | C | 1.2 |
|  | 243 | D | 1.4 |
|  | 510 | D | 1.8 |
| Comparative 2 | 148 | C | 1.3 |
|  | 234 | D | 1.5 |
|  | 528 | D | 1.9 |
| Comparative 3 | 135 | D | 1.8 |
|  | 243 | D | 2.0 |
|  | 510 | D | 2.2 |
| Comparative 4 | 135 | D | 1.8 |

TABLE 2

| No. | Substitution degree of acetyl group | Substitution degree of propyl group | Alkali-earth metal (ppm) | Tear strength (g/sheet) |
|---|---|---|---|---|
| Example 2 | 2.78 | — | 27 | 33 |
| Example 3 | 2.71 | 0.17 | 19 | 35 |
| Example 13 | 2.91 | — | 48 | 29 |
| Comparative 4 | 2.01 | 0.91 | 135 | 23 |

As is shown in Table 1, it is understood that a dope having little turbidity and a film having a low haze can be obtained both by the chilling dissolution method and the pressure applying dissolving method when the content of alkali-earth metal is within the range of the invention. In contrast, when the content of alkali-earth metal is large, the turbidity of the dope is considerable and the haze of film is high. It is understood that the alkali-earth metal content has important roles in the chilling dissolution method and the pressure applying dissolving method.

As is shown in Table 2, it is understood that Comparative Example 4, containing a large amount of propyl group, is inferior in the tear strength.

What is claimed is:

1. A method for preparing a solution of cellulose acylate having slight or no turbidity comprising the steps of
   chilling a first organic solvent containing substantially no chlorinated organic solvent at a temperature of from $-100°$ C. to $-10°$ C.,
   mixing cellulose acylate containing an alkali-earth metal compound in an amount of from 10 ppm to 50 ppm with said chilled first organic solvent to form a mixture,
   swelling the cellulose acylate in the mixture, and
   dissolving the mixture containing the swollen cellulose acylate by mixing the mixture containing swollen cellulose acylate with a second organic solvent of temperature of from $0°$ C. to $120°$ C. having a composition substantially the same as the first organic solvent.

2. The method of claim 1, wherein said method further comprises the step of
   separating a part of said first organic solvent from the mixture to concentrate the mixture after the step of swelling the cellulose acylate in the mixture.

3. The method of claim 2, further comprising transporting the first organic solvent during the mixing with the cellulose acylate.

4. The method of claim 3, wherein the step of mixing the cellulose acylate is carried out by
   continuously adding cellulose acylate into the chilled organic solvent being transported.

5. The method of claim 3, wherein the step of mixing the cellulose acylate is carried out by
   continuously adding cellulose acylate containing an alkali-earth metal compound in an amount of from 10 ppm to 50 ppm into said chilled organic solvent being transported to form a mixture, and the step of dissolving the concentrated mixture is carried out by
   mixing with a second organic solvent having a composition substantially the same as the first organic solvent being transported at a temperature of from $0°$ C. to $120°$ C.

6. The method of claim 3, wherein the step of dissolving the concentrated mixture is carried out by
   continuously mixing with an organic solvent having a composition substantially the same as that used in the mixture being transported which is previously heated to a temperature of from $0°$ C. to $120°$ C.

7. The method of claim 2, wherein the organic solvent containing substantially no chlorinated organic solvent separated from the swollen mixture was circulated to reuse.

8. The method of claim 1, wherein said method comprises the steps of
   chilling a first organic solvent containing substantially no chlorine-containing organic solvent at a temperature of from $-100°$ C. to $-10°$ C.,
   mixing cellulose acylate containing an alkali-earth metal compound in an amount of from 10 ppm to 50 ppm with said chilled first organic solvent to form a mixture,
   swelling the cellulose acylate in the mixture while applying a pressure of from 50 to 4000 kgf/cm$^2$,
   dissolving the mixture by heating after releasing the pressure by a pressure of from 0.1 kgf/cm$^2$ to 10 kgf cm$^2$.

9. The method of claim 1, wherein said cellulose acylate is one in which the hydroxyl group of cellulose is substituted by an acyl group having from 2 to 5 carbon atoms.

10. The method of claim 1, wherein said cellulose acylate satisfies all of the following equations I through IV;

$2.6 \leq A+B \leq 3.0$     I $2.0 \leq A \leq 3.0$     II $0 \leq B \leq 0.8$     III $1.9 < A-B.$     IV wherein A is a substitution degree of acetyl group and B is a substitution degree of acyl group having from 3 to 5 carbon atoms.

11. The method of claim 1, wherein said cellulose acylate has a substitution degree of from 2.70 to 2.96.

12. The method of claim 1, wherein said cellulose acylate has a viscosity average polymerization degree of from 250 to 550.

13. The method of claim 1, wherein the concentration of the cellulose acylate in said solution is within the range of from 15% to 35% by weight.

14. The method of claim 1, wherein the first organic solvent is comprised of (a) 65 to 85% by weight of methyl acetate and (b) 15 to 35% by weight of an organic solvent which is not methyl acetate and contains no chlorine.

15. The method of claim 14 wherein (b) is acetone.

16. The method of claim 1, wherein an additive is added at any steps of preparation of the cellulose acylate solution or at a step provided after the steps of the preparation of the cellulose acylate solution.

17. The method of claim 1, wherein said additive is a plasticizer and the adding amount of said plasticizer is within the range of from 5% to 30% by weight.

18. A method for producing a cellulose acylate film comprising the steps of
    chilling an organic solvent containing no chlorinated organic solvent at a temperature of from $-100°$ C. to $-10°$ C.,
    mixing cellulose acylate containing an alkali-earth metal compound in an amount of from 10 ppm to 50 ppm with said chilled organic solvent to form a mixture,
    swelling the cellulose acylate in the mixture, and
    dissolving the mixture containing the swollen cellulose acylate by heating, and casting the solution to form a film.

19. A cellulose acylate film produced by the method by casting the solution which is prepared by a method comprising the steps of chilling an organic solvent containing no chlorinated organic solvent at a temperature of from −100° C. to −10° C., mixing cellulose acylate containing an alkali-earth metal compound in an mount of from 10 ppm to 50 ppm with said chilled organic solvent to form a mixture, swelling the cellulose acylate in the mixture, and dissolving the mixture containing the swollen cellulose acylate by heating.

20. A method for preparing a solution of cellulose acylate comprising the steps of mixing cellulose acylate containing an alkali-earth metal compound in an amount of from 10 ppm to 50 ppm with an organic solvent containing no chlorine-containing organic solvent to form a mixture, chilling the mixture at a temperature of from −100° C. to −10° C., dissolving the mixture by heating to a temperature of from 0° C. to 50° C.

* * * * *